United States Patent [19]

Montone et al.

[11] 3,903,363

[45] Sept. 2, 1975

[54] AUTOMATIC POSITIONING SYSTEM AND METHOD

[75] Inventors: Liber J. Montone; Donald C. Walls, both of Reading, Pa.

[73] Assignee: Western Electric Company, Incorporated, New York, N.Y.

[22] Filed: May 31, 1974

[21] Appl. No.: 475,006

[52] U.S. Cl. .............................. 178/6.8; 178/DIG. 1

[51] Int. Cl. .............................................. H04n 7/18

[58] Field of Search......... 178/6.8, DIG. 1, DIG. 21, 178/DIG. 37, DIG. 38; 356/156, 157

[56] References Cited

UNITED STATES PATENTS

| | | | |
|---|---|---|---|
| 3,207,904 | 9/1965 | Heinz | 250/202 |
| 3,497,705 | 2/1970 | Adler | 250/219 |
| 3,581,375 | 6/1971 | Rottman | 29/409 |
| 3,593,286 | 7/1971 | Altman | 178/6.8 |
| 3,749,830 | 7/1973 | Blitchington | 178/6.8 |
| 3,796,497 | 3/1974 | Mathisen | 356/152 |
| 3,811,011 | 5/1974 | Hardy | 178/6.8 |

*Primary Examiner*—Howard W. Britton
*Assistant Examiner*—Michael A. Masinick
*Attorney, Agent, or Firm*—G. W. Houseweart

[57] ABSTRACT

A first workpiece is automatically and precisely aligned to a second workpiece by superimposing and aligning an artificially, electronically generated reference pattern of zones to a video image of the first workpiece. Then, a video image of the second workpiece is superimposed on, and aligned to, the reference pattern. Embodiments are disclosed for automatically aligning a semiconductor chip to a compliant tape window and then to a substrate for bonding operations and for automatically aligning a semiconductor wafer to a photoresist mask. The pattern of reference zones is generated electronically by applying the horizontal and vertical sync pulses of a vidicon to appropriate logic circuitry to thus artificially produce electronic signals representative of a video image of the desired pattern of zones. To accomplish X, Y and $\theta$ positioning, detected video coincident with selected opposed zones is summed, compared, and equalized by moving the zones or the workpiece. To align the pattern of zones to the first workpiece, motors are used to adjust variable resistors in the logic circuitry to move the pattern. To align the second workpiece to the pattern of zones, motors are used to drive micromanipulators to move the workpiece.

39 Claims, 26 Drawing Figures

PATENTED SEP 2 1975 3,903,363

SHEET 3

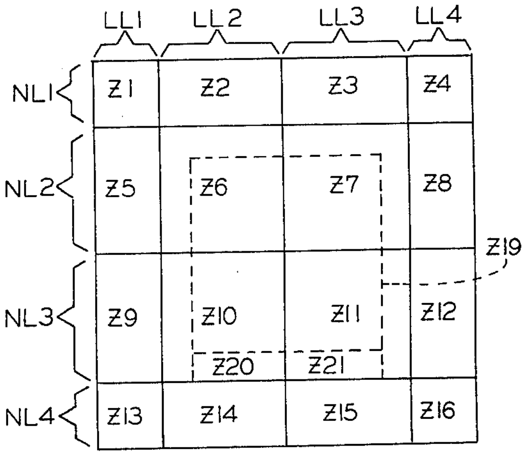
FIG-5A
FIG-5B
| X INPUT | Y INPUT | Z OUTPUT |
|---|---|---|
| NL | LL | ZONE |
| 1 | 1 | Z1 |
| 1 | 2 | Z2 |
| 1 | 3 | Z3 |
| 1 | 4 | Z4 |
| 2 | 1 | Z5 |
| 2 | 2 | Z6 |
| 2 | 3 | Z7 |
| 2 | 4 | Z8 |
| 3 | 1 | Z9 |
| 3 | 2 | Z10 |
| 3 | 3 | Z11 |
| 3 | 4 | Z12 |
| 4 | 1 | Z13 |
| 4 | 2 | Z14 |
| 4 | 3 | Z15 |
| 4 | 4 | Z16 |
| B | B | Z19 |
| θ | θ | Z20 Z21 |
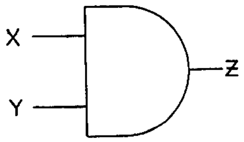
FIG-5C

AUTOMATIC POSITIONING SYSTEM AND METHOD

BACKGROUND OF THE INVENTION

1. Field of the Invention

The invention relates to methods and apparatus for automatically and precisely positioning one article with respect to another article; and more particularly, for aligning semiconductor devices to substrates for bonding, and for aligning semiconductor wafers or thin film substrates to photoresist masks at various stages of manufacturing.

Direct automatic alignment of such workpieces by directly comparing the geometry of one with the geometry of another is typically not feasible due to the clutter of unnecessary and varying geometric detail within the workpieces. More specifically, semiconductor devices and integrated circuits often are of the beam lead type and include a semiconductor body having interconnected circuit elements inseparably associated on or within the body. Cantilevered metallic beams extend from the body for providing both electrical and mechanical connections to a header or to circuit patterns formed on a substrate.

In a bonding application of such devices, the beam leads must be aligned to corresponding metallized patterns preformed on the header or substrate. Although the beam leads typically are of uniform length and width on a particular device, such leads may and usually do vary in length and width and also in actual position on the semiconductor body from one circuit type to another. Further, the electrical interconnection of elements disposed within the semiconductive body typically is of a material of the type used for the beam leads and of course, varies from circuit type to circuit type, and in any event, constitutes a clutter of unnecessary geometric detail for the purpose of aligning and bonding the semiconductor device to the headers or substrates.

During the manufacture of a semiconductor beam lead integrated circuit, a plurality of photoresist masking steps are performed. In each step, a mask must be precisely aligned to minute geometric patterns formed by previous masking operations in an environment of often hundreds or thousands of extremely minute, e.g., of the order of 0.1 mil, geometric features. Such alignment must take place in an environment of constantly changing topographical and light reflectivity conditions due to the continual forming and reforming of photoresist layers and oxide layers and the cutting of holes therethrough for selectively introducing dopant impurities into the semiconductor body or for forming electrical connections.

2. Description of the Prior Art

Many systems and types of systems have been and are being developed for automatically aligning the aforementioned and other types of workpieces. Such systems include mechanically complex apparatus involving scanning mirrors and optical components such as described in U.S. Pat. No. 3,581,375 issued June 1, 1971 to H. R. Rottmann, and a great variety of systems employing video cameras, most of which are directed toward identifying specific geometric features on one workpiece by observing its location with respect to a particular scan line of the video system, such as disclosed in U.S. Pat. No. 3,515,877 issued June 2, 1970 to D. W. Baxter et al.

A different approach, directed to positioning a workpiece with respect to a predetermined location, disclosed in U.S. Pat. application, Ser. No. 378,307 filed July 11, 1973 and assigned to the assignee hereof, is directed to applying the horizontal and vertical sync signals of a video camera to logic circuitry to generate electrical signals representing, in synchronism with the video image of a workpiece, one or a plurality of boundary markers with respect to which the workpiece is positioned. Those electrical signals representing a video image of boundary markers are superimposed upon the actual video image of the workpiece to be positioned and are adjusted to be of size and disposition such that when the workpiece is not properly positioned, the video image of the workpiece overlaps, i.e., coincides with, a portion of one or more of the boundary markers. Positioning is accomplished by moving the workpiece so as to reduce coincidence of the video image thereof and the boundary marker. U.S. Pat. No. 3,814,845 issued June 4, 1974 R. W. Hurlbrink et al., also assigned to the assignee hereof, discloses an improvement to the last-mentioned positioning system wherein the coincidence of images is minimized or equalized using an averaging technique to facilitate positioning by reduction or equalization of average coincidence.

Still another form of an automatic positioning system, disclosed in "Space-Age Production By Automatic Image Alignment" *Manufacturing Engineering and Management*, March 1971, involves the use of a specialized video camera capable of a spiral scan in combination with a permanent memory for storing electronic signals representing video images produced by the spiral scan. In operation a first workpiece is manually positioned at a desired location and a video image of that workpiece in that locations is stored in the memory. Successive workpieces are automatically positioned at the desired location by comparing a video image of the workpiece to the video image stored in memory and moving the workpiece until the images correspond.

A significant problem inherent in such a system is the feature of aligning a plurality of workpieces to a fixed image in memory. This is a problem because the operating characteristics of the video camera charge or drift with time and line voltage such that aligning a real time image with a permanently stored representation of the image can in fact produce a misaligned product.

SUMMARY OF THE INVENTION

In view of the aforementioned and other problems inherent in prior art methods and apparatus for automatically and precisely aligning one article with another, it is an object of this invention to provide new and improved methods and apparatus for automatically and precisely aligning articles.

It is a further object of this invention to provide methods and apparatus for automatically and precisely aligning one article with another by comparing essentially real time images of the articles to a real time generated reference pattern of zones to avoid the aforementioned problem of drifting characteristics of imaging systems with respect to time.

To these and other ends, a method of aligning a first article to a second article in accordance with this invention includes producing a first electrical signal indicative of the first article and a second electrical signal indicative of a reference zone. The second signal is modified in response to a comparison of first and second signals to align the reference zone to the article. Then, the second article is moved, in response to a comparison of the modified second signal and a third signal indicative of the second article, to align the second article to the reference zone. Because the second article is aligned with the reference zone after the reference zone is aligned with the first article, the second article thereby is aligned with the first article.

More specifically, an automatic alignment system in accordance with a disclosed embodiment of this invention includes indirectly aligning articles by first aligning an artificially generated video image of a pattern of reference zones to selected portions of a video image of a first article and then aligning selected portions of a video image of a second article to the image of the reference zones.

In particular disclosed embodiments, electronic signals representing a video image of the reference zones are artificially generated in synchronism with the actual vidicon camera-generated video image of an article by applying the horizontal and vertical sync pulses of the video camera to appropriate logic circuitry.

Although it will be appreciated that the principles of this invention may be used to accomplish automatic alignment of essentially any article or object with essentially any other article or object, for simplicity and clarity of explanation this invention will be described principally with reference to a first embodiment for automatically aligning semiconductor devices to substrates for bonding and with reference to a second embodiment for automatically aligning semiconductor wafers or thin film substrates to photoresist masks.

In the disclosed bonding embodiment, a video image of a pattern of reference zones is superimposed upon a video image of a bonding medium such as a bonding head or the window in, and surrounding material of, a compliant tape. The zones are automatically aligned with the window by first generating and applying signals to motors to adjust variable resistors in logic circuitry employed to generate the pattern of zones.

Then the image of the pattern of zones is superimposed upon a video image of a semiconductor device to be bonded to a substrate. Coincidence of selected features of the video image of the semiconductor device and the pattern of zones is sensed; and signals are generated and applied to motors to move the semiconductor device to align the device with the video image of the reference zones. Because the pattern of zones was aligned to the compliant tape and then the device was aligned to the pattern of zones, the device necessarily is aligned with the window in the compliant tape.

At this point, the device is picked up and brought into contact with the compliant tape; and a video image of the device and compliant tape is superimposed upon the video image of the reference zones to determine whether any loss in alignment was introduced during the pick-up step. If necessary, the position of the video image of the reference zones is modified by generating and applying signals to the motors to adjust variable resistors to the logic circuitry employed to generate those zones to realign the image of the reference zones on the image of the device and compliant tape.

Finally, the image of the reference zones is superimposed upon a video image of the substrate and conductive patterns to which the beam leads of the semiconductor chip are to be bonded; coincidence of certain features of the substrate and the reference zones is sensed; and signals are generated and applied to motors to move the substrate to align it with the reference zones. Once so aligned the substrate necessarily is aligned with the semiconductor device and compliant tape; and the compliant tape and device can be brought into contact with the substrate and bonding can take place.

In the embodiment for aligning a semiconductor wafer to a photoresist mask, a video image of the reference zones is superimposed upon a video image of certain selected features, typically specially designed fiducial marks, on the mask, advantageously using a split-field microscope for viewing the photoresist mask. Coincidence of the fiducial marks with the reference zones is sensed; and signals are generated and applied to motors to adjust variable resistors in the logic circuitry employed to generate the reference zones to effectively reposition the reference zones into alignment with the fiducial marks of the photoresist mask. Then the image of the reference zones is superimposed upon a video image of fiducial marks on a semiconductor wafer, again advantageously using the split-field microscope. Coincidence of the reference zones with the fiducial marks is sensed; and signals are generated and applied to motors to move the semiconductor wafer to reposition the fiducial marks into alignment with the reference zones.

In both of the aforementioned embodiments the reference zones advantageously comprise a matrix of discrete opposed areas. With such zones, coincidence of opposed features of the workpiece to be aligned with the discrete zones can be sensed and the alignment can be achieved by balancing or equalizing the area coincidence of those opposed features with the opposed zones.

BRIEF DESCRIPTION OF THE DRAWING

The aforementioned and other features, characteristics, and advantages, and the invention in general, will be better understood from the following more detailed description taken in conjunction with the accompanying drawing in which:

FIG. 5A is a more detailed schematic representation of an advantageous pattern of reference zones in accordance with the aforementioned first embodiment of this invention;

FIG. 5B is a table listing the respective nodes of the circuit of FIG. 4 which are operative in producing the various respective zones of FIG. 5A;

FIG. 5C is a simple logic circuit representation for aiding in understanding the table of FIG. 5B;

GENERAL DESCRIPTION OF BONDER EMBODIMENT

Figure 1:
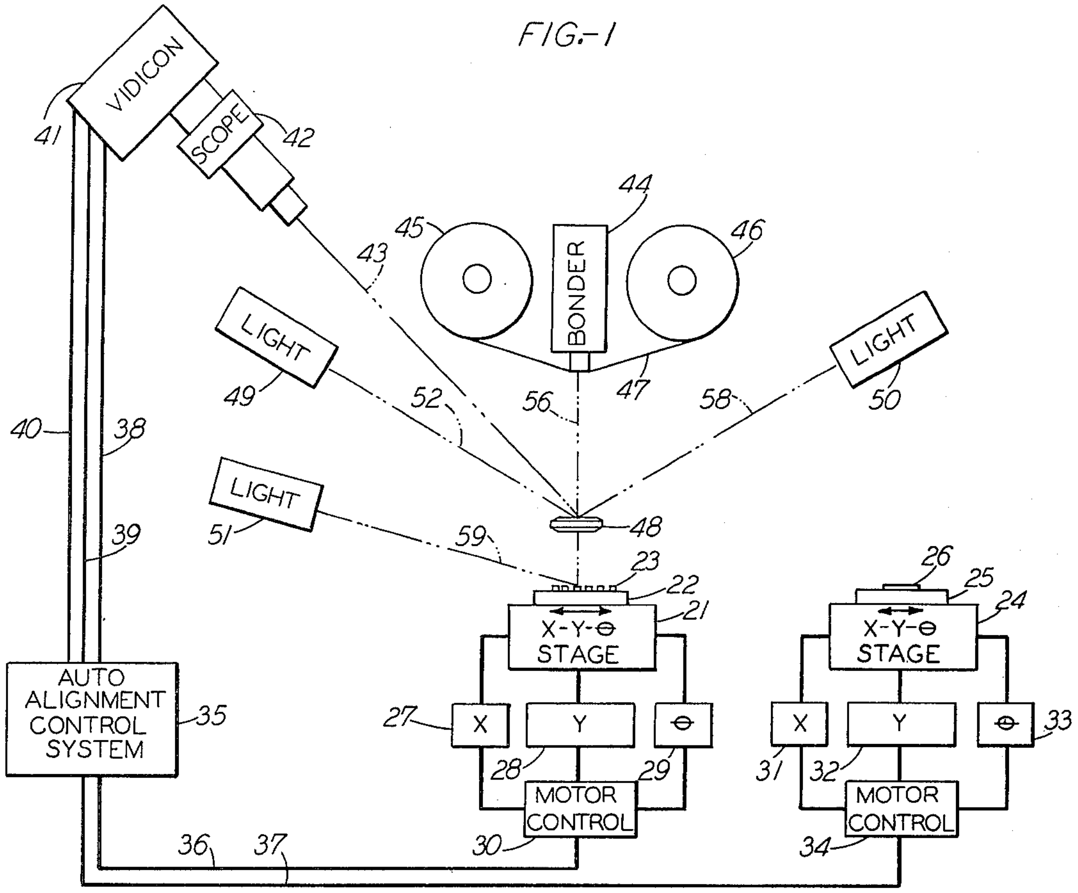
FIG. 1 is an electrical and mechanical schematic block diagram of a video-controlled bonder in accordance with a first embodiment of this invention.

With reference now to the drawing, FIG. 1 shows an electrical and mechanical schematic block diagram of a video controlled bonder in accordance with a first embodiment of this invention. As shown the bonder includes a first motor-controlled stage 21 on which a carrier 22 containing semiconductor chips or devices 23 has been placed and a second and separate motor-control stage 24 on which a carrier 25 containing a plurality of substrates 26 to which the semiconductor chips are to be bonded has been placed.

Motor-controlled stage 21 is driven by three independent motors, 27 for movement in the X direction, 28 for movement in the Y direction, and 29 for movement in a rotary or $\theta$ direction. Motors 27–29 are controlled by a motor-control circuit 30 which may be any standard commercially available motor control circuit or which may be a general purpose computer which functions to meter out the required pulses or other voltages for causing the desired precise movement of each of the motors 27–29.

Similarly, stage 24 is driven by a separate plurality of motors, 31 for the X direction, 32 for the Y direction, and 33 for the rotary or $\theta$ direction. Motors 31–33 are in turn controlled by a motor control circuit 34 which may be in all respects identical with motor control circuit 30.

Motor-control circuits 30 and 34 are in turn controlled by an Automatic Alignment Control System 35 which is a principal part of the instant invention and which supplies electronic control signals to motor-control circuits 30 and 34 via lines 36 and 37, respectively. Alignment Control System 35 is coupled via a plurality of lines 38–40 to a vidicon television camera 41. As will be discussed in much greater detail hereinbelow, lines 38–40 couple the horizontal sync signals, the vertical sync signals, and electronic signals representing video images produced by vidicon 41 to the Alignment Control System 35. Vidicon 41 produces microscopic images of the bonding operation inasmuch as the bonding is viewed by vidicon 41 through a microscope 42 along a light path indicated by broken line 43.

A bonding head 44 is shown disposed between a supply wheel 45 and a take-up wheel 46 for compliant tape 47. Features 44–47 comprise what is commonly termed a compliant type bonding module, which is described in greater detail in U.S. Pat. No. 3,640,444 issued Feb. 8, 1972 to D. P. Ludwig, and assigned to the assignee hereof, and which is commercially available. Of course alignment to a more conventional bonding medium such as a bonding head without compliant tape also is contemplated and within the scope of this invention.

In operation, wheels 45 and 46 are activated to index a compliant tape window underneath the bonding tip of bonding head 44. Light source 49 is activated to direct a beam of light, represented schematically by broken line 52, onto one side of a multi-sided prism 48, which in turn causes that light to be redirected upon the compliant tape window. Light reflected from the compliant tape material surrounding the window strikes prism 48 and is deflected along path 43 to microscope 42 and vidicon 41. Vidicon 41 produces electronic signals representing a microscopic image of the compliant tape window and the compliant tape material theresurrounding; and those electronic signals are coupled via line 40 to the Alignment Control System 35.

Figure 2:
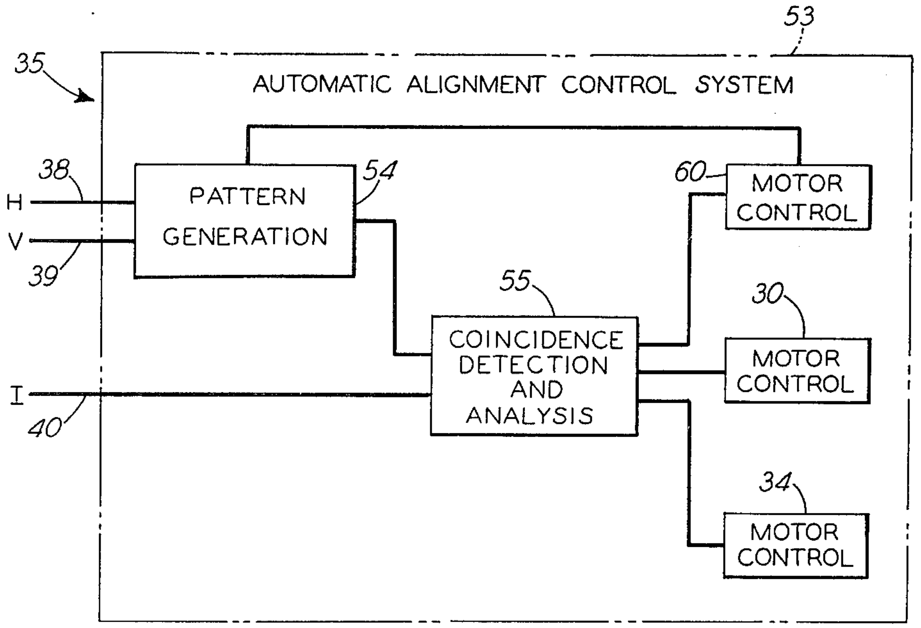
FIG. 2 is an electrical block schematic diagram of the automatic alignment control system employed on the bonder of FIG. 1 in accordance with this invention.

FIG. 2 shows, within broken line rectangle 53, an electrical schematic block diagram of an Automatic Alignment Control System 35 in accordance with this invention. As seen, system 35 includes a pattern generation circuit 54 responsive to the horizontal and vertical sync signals on lines 38 and 39 from vidicon 41 for generating electronic signals representing a video image of a pattern of reference zones synchronized with the video image produced by vidicon 41. The signals from pattern generation circuit 54 and the electronic signals representing the video image from vidicon 41, conducted via line 40, are simultaneously applied to a coincidence detection and analysis circuit 55 which detects and analyzes, in a manner to be described in detail hereinbelow, the degree to which predetermined portions of the video images coincide. Based upon this detection and analysis, electronic signals are generated by circuit 55 and applied to appropriate motor-control circuits 30 and 34 (FIG. 1) and 60 (FIG. 2) for moving either the video image of the pattern of reference zones or stage 21 or stage 24 depending on the particular portion of the sequence in which the bonder is at that time operating.

With this generalized understanding of the operation of Automatic Alignment Control System 35, reference is again made to the video image of the compliant tape window which was being described with respect to FIG. 1. System 35 superimposes the electronic video image of the compliant tape window and the video image of the pattern of reference zones and, by applying signals to motor control circuit 60 (FIG. 2), adjusts variable resistors in pattern generation circuit 54 to effectively move the image of the reference zones with respect to the image of the tape window sufficiently that the pattern of zones is aligned with the window.

Then the light from source 49 is interrupted and light is provided by source 50, from a different angle, to a different face of prism 48 sufficient to illuminate one of the semiconductor chips 23 on stage 21. Light reflected from that semiconductor chip passes back to the prism and is directed to microscope 42, resulting in an image of the chip being produced by vidicon 41 and provided to alignment system 35. Alignment system 35 superimposes the image of the semiconductor chip upon the image of the pattern of reference zones, detects and analyzes coincidence of the two images, and generates and applies appropriate electronic signals to motor control circuit 30 to move the semiconductor chip until its image is centered upon, or otherwise aligned in a predetermined fashion with, the image of the reference zones. At this point, since the reference zones were aligned with the tape window and the semiconductor chip was aligned with the reference zones, the semiconductor chip necessarily is aligned with the tape window.

With the aforementioned alignment accomplished, prism 48 swings out of the way, by conventional means not shown in FIG. 1, and the bonding module is lowered along bonding axis 56 to pick up the aligned chip into the tape window. This pickup may be accomplished, for example, by a vacuum tip located above the tape window, and which, during this pickup operation, extends through the tape window and pulls the aligned chip into contact with the tape. Once the chip has been picked up, the bonding module is returned to its rest position shown in FIG. 1 and prism 48 is returned to its rest position on the bonding axis as shown in FIG. 1.

Due to mechanical inaccuracies, some misalignment of the chip with respect to the tape may be introduced during the pickup operation. Thus, for maximum accuracy of subsequent operations, light source 49 is again activated to illuminate the chip in the tape and thereby to result in vidicon 41 producing an image of the chip in contact with the tape. Control system 35 superimposes that image upon the reference zones and realigns the reference zones with the image of the chip in the tape.

To complete the bonding operation, a substrate 26 must first be aligned to the semiconductor chip and tape window. To accomplish this alignment, stage 21 is moved off the bonding axis by conventional means not shown, and stage 24 is moved into position on the bonding axis, replacing stage 21. With light from sources 49 and 50 interrupted, light from a third source 51 directly illuminates the surface of a substrate 26 along a path 59 inclined at an acute angle with respect to the substrate surface. Light reflected from substrate 26 passes through prism 48, which is now in its rest position, and is directed through microscope 42 and into vidicon 41.

Vidicon 41 produces an image of the substrate and provides signals representing such image to control system 35 along line 40. Control system 35 superimposes the image of the substrate upon the image of the pattern of reference zones, which, it must be remembered, were accurately realigned with the image of the semiconductor chip in the tape; and coincidence of the images is detected and analyzed. Based upon that analysis, signals are generated and applied by circuit 55 to motor control circuit 34 to move the substrate 26 sufficiently to center it or otherwise align it in a predetermined fashion with the pattern of reference zones. Being so aligned, the substrate 26 is therefore also aligned to the semiconductive chip and compliant tape window.

Accordingly, all that remains to be done to complete the bond is for prism 48 to swing out of the way off of the bonding axis 56 and for the bonding module, comprising features 44–47, to be lowered bringing the chip and compliant window into contact with the substrate with sufficient force, heat and other parameters to complete the bond. After the bond is completed, the bonding module is raised to its rest position; prism 48 is moved back into position on the bonding axis, stage 24 is moved off the bonding axis; and stage 21 is brought back into its initial position, shown in FIG. 1, to enable the alignment and bonding of the next successive chip and substrate. Of course, for bonding operations where the chips have previously been placed in the compliant tape by other means, only the last half of the above-described operations, i.e., aligning the chip-in-tape to the substrate, need be done to prepare for a bond.

Having described generally and conceptually the operation of the automatic bonder of FIG. 1 in accordance with this invention, there will now be described in detail an advantageous pattern of reference zones and their relationships to the workpieces, as well as circuits for generating the pattern of zones and for detecting and analyzing the coincidence information.

DETAILED DESCRIPTION OF ALIGNMENT OPERATIONS

FIGS. 3A–3E are schematic representations of the reference zones and video images of workpieces as they appear if displayed on a TV monitor during each of the alignment operations in accordance with this invention. From the outset, it should be understood that, of course, the images need not actually be televised on a monitor during the steps involving superimposition and alignment of the images. Rather, all that is required is that the electronic signals representating those images be superimposed and analyzed in circuitry such as the coincidence detection analysis circuit 55 shown in FIG. 2.

Figure 3A:
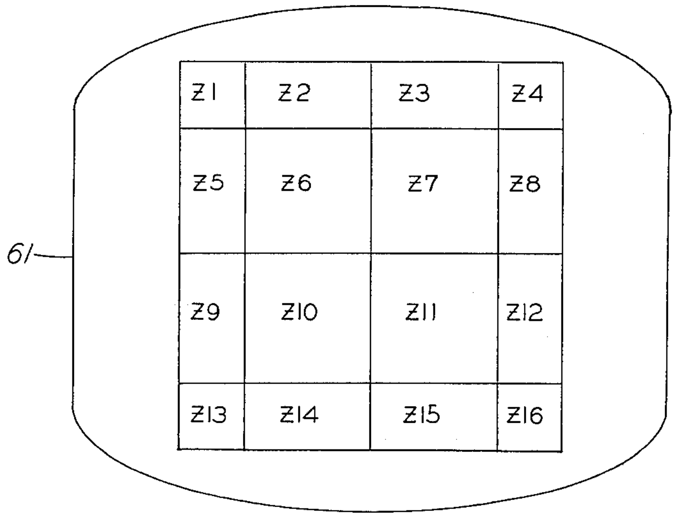
FIGS. 3A–3E are schematic representations of the reference zones and video images of workpieces in accordance with this invention as they appear if displayed on a TV monitor.
Figure 4:
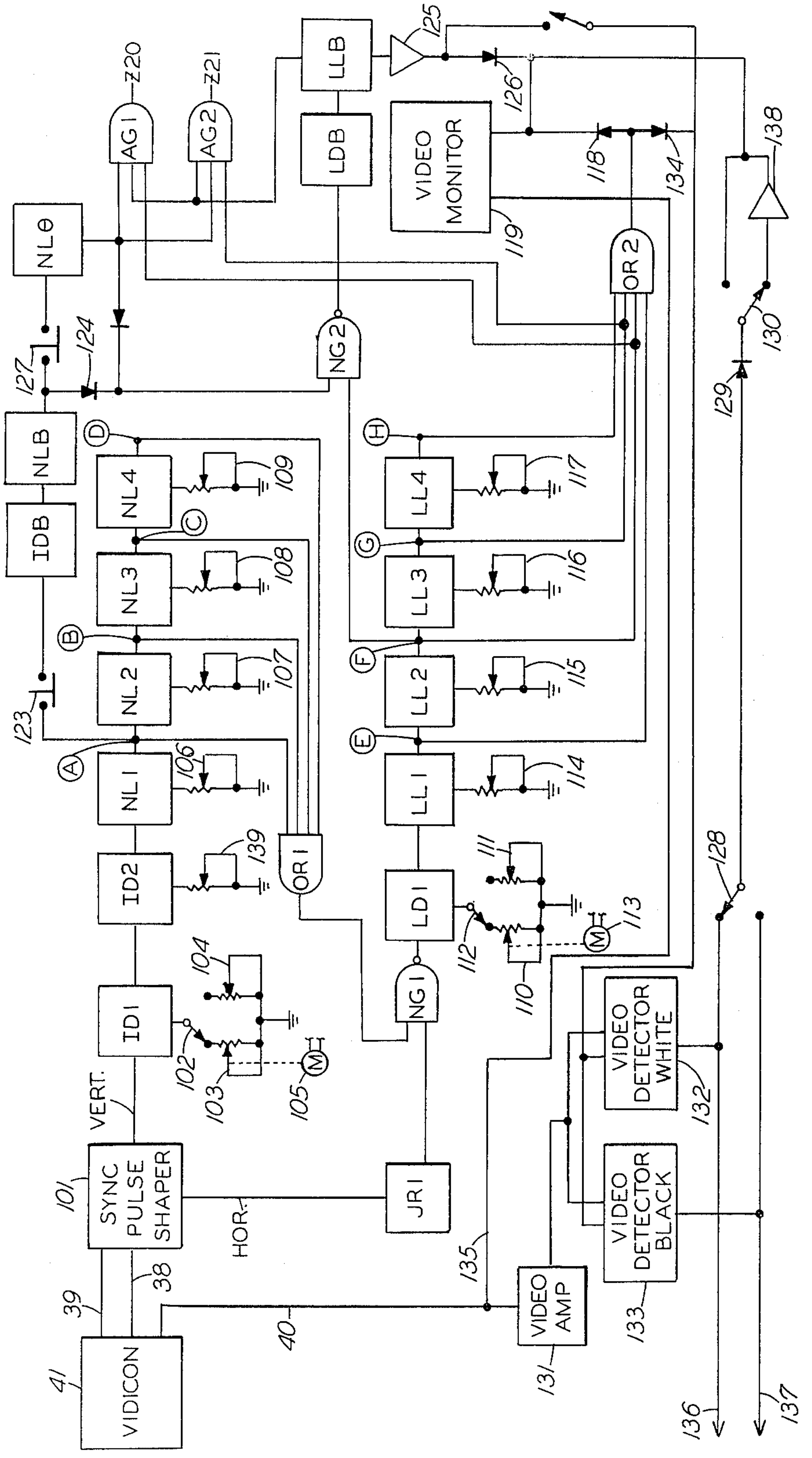
FIG. 4 is an electrical schematic block diagram of a logic circuit for generating the reference zones in accordance with this invention.

FIG. 3A shows on a TV monitor 61, a pattern of reference zones advantageous for use in aligning beam lead semiconductor chips to compliant tape windows and thin film substrates. As seen, the pattern includes a matrix of 16 zones, labeled consecutively from Z1 to Z16. Logic circuitry for generating the pattern of reference zones is shown in FIG. 4 and will be described hereinbelow. Suffice it to say, at this point, that the circuitry includes motor driven variable resistors through which it is possible, automatically or manually, to change the size and position of each of the zones.

In FIG. 3A the rectilinear lines defining the boundaries of the zones are not functional, as will be appreciated from the ensuing discussion, and need not even appear on the TV monitor, but are illustrated only for clarity to indicate and define the extent of each of the zones. For the purpose of this description, zones Z1–Z16 advantageously are white on an otherwise black background; and, of course, each zone may be thought of as merely a visual representation of a selected time period synchronized with a frame scan of the vidicon.

Figure 3B:
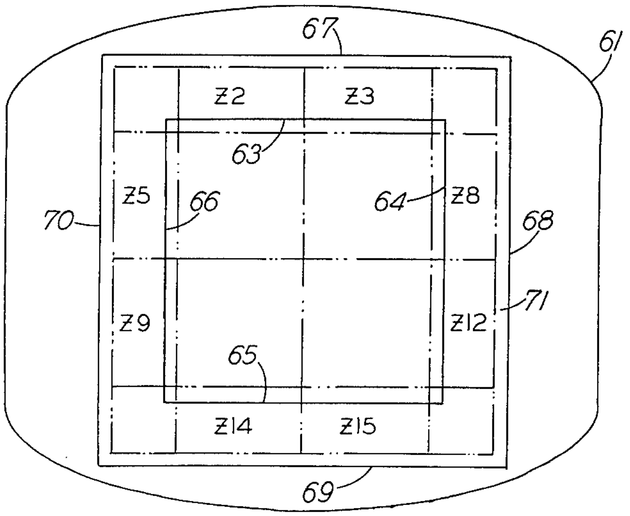

In FIG. 3B the pattern of zones Z1–Z16 is shown superimposed upon the video image of a compliant tape window. A compliant tape usually includes a depressed or "embossed" portion immediately surrounding the window; and only the embossed portion is shown in FIG. 3B because the rest of the tape is out of focus for the microscope. The rectangle defined within lines 63–66 defines the edge of the tape window; and the rectangle defined by lines 67–70 represents the outer edge of the embossed portion. Thus, the portion of the compliant tape material visible in the image of FIG. 3B is that area 71 between the rectangle defined by lines 63–66 and the rectangle defined by lines 67–70. Typically, area 71 appears as white video on an otherwise black background, except for the white video of zone Z1–Z16.

To align the pattern of zones Z1–Z16 to the compliant tape window, that portion of area 71 coincident with zones Z2 plus Z3 is balanced against that portion of the area coincident with zones Z14 plus Z15 to give alignment in the vertical or Y direction. Similarly that portion of area 71 coincident with zones Z5 plus Z9 is balanced against the area coincident with zones Z8 plus Z12 for alignment in the left and right or X direction. Ordinarily the mechanical equipment which holds and indexes the compliant tape is sufficiently accurate that no alignment of the reference zones in a $\theta$ or rotary direction is required.

The amount of area coincident with any given zone can be uniquely represented and stored by gating pulses from a high speed oscillator to a capacitor during that portion of the frame time in which the coincidence occurs. Accordingly, for each zone the corresponding capacitor is charged to a voltage proportional to the amount of time which the area was coincident with the zone. These voltages then can be added and differentially detected and signals generated to drive the motors for moving the pattern of zones, in a closed loop fashion, until the coincidence is balanced or equalized.

Figure 3C:
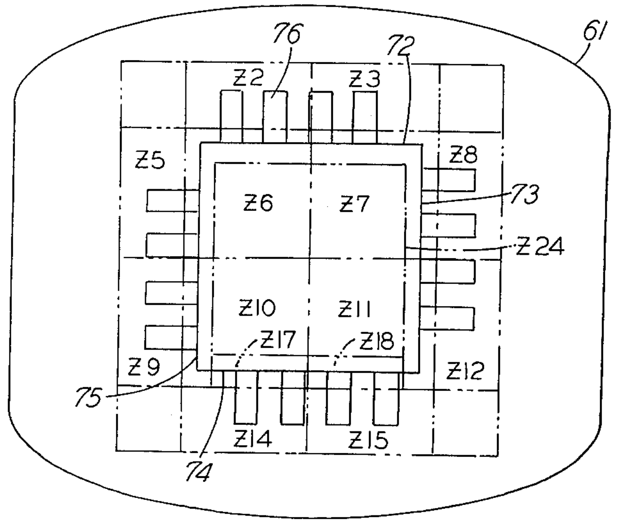

With reference now to FIG. 3C, there is shown a schematic representation of a TV monitor image of the pattern of zones Z1–Z16 superimposed upon an image of a beam lead semiconductor chip, defined within the rectangle having sides 72–75. As shown, the beam lead chip includes a plurality of beam leads 76 which extend into outer zones Z2, Z3, Z5, Z8, Z9, Z12, Z14 and Z15. Typically the beam lead chip is disposed face down on the carrier and so the backside of the chip, which has no metallization thereon, appears black in the image while the beam leads 76, being shiny, appear white.

For alignment, it has been found advantageous to detect and balance the amount by which the beam leads are coincident with inner zones Z6, Z7, Z10 and Z11. To this end, for Y alignment, the amount of white video coincident with zones Z6 plus Z7 is balanced against the amount of white video coincident with Z10 plus Z11. Similarly for X alignment, the amount of white video coincident with zones Z6 plus Z10 is balanced against the amount of white video coincident with zones Z7 plus Z11.

For accurate alignment of the chip to the zones, rotary or $\theta$ alignment usually is required. To accomplish such alignment, the amount of white (beam lead) video coincident with diagonally opposed zones Z6 plus Z11 could be balanced against the amount of white video coincident with diagonally opposed zones Z7 plus Z10. However, for rotary alignment, it has been found advantageous to generate a pair of additional zones Z17 and Z18 to overlap an edge, e.g., the lower edge 74 of the chip. The amount of white video (beam lead) coincident with zone Z17 is balanced against or equalized with the amount of white video coincident with zone Z18. Thiis equalization of coincident video is accomplished in a fashion analogous to that with respect to the X and Y equalization, namely (a) by gating pulses from a high speed oscillator to a capacitor to develop a voltage representative of the amount of time that white video is coincident with zone Z17 and (b) similarly gating pulses to a different capacitor during the time that white video is coincident with zone Z18. The proportional voltages developed on the capacitors are differentially detected and signals are generated and applied to motor controller 30 in FIG. 1 for application of signals to the $\theta$- motor 29 to cause either clockwise or counterclockwise rotary motion of stage 21 and carrier 22. Once the semiconductor chip is aligned to the zones, it is also necessarily aligned to the compliant tape window, since the zones were aligned to the compliant tape window.

As discussed above with respect to FIG. 1, at this point in the cycle, prism 48 (FIG. 1) moves off the bonding axis and the bonding module comes down and picks up the chip into contact with the compliant tape. The bonding module then returns to its rest position; and the prism moves back into position into the bonding axis.

Figure 3D:
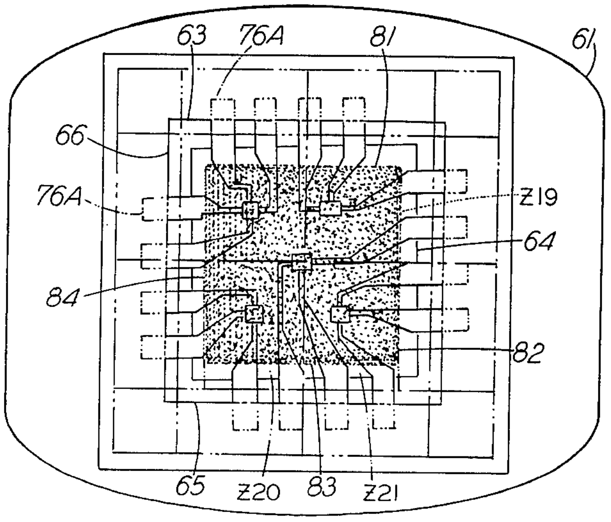

FIG. 3D is a schematic representation of the TV monitor image of the chip and the compliant tape window as seen looking up from prism 48. As seen in FIG. 3D, the image now is of the front side of the semiconductor chip which includes all of the interconnecting metallization patterns for the various components on the integrated circuit included therein. Of course this interconnection metallization includes a considerable amount of geometric detail which is unnecessary for the alignment operations and which therefore merely represents clutter to an automatic alignment system. To enable the automatic detection mechanism to ignore such clutter, an additional pattern Z19, termed a "blankout" pattern, defined by the rectangle comprising lines 81–84, is generated by logic circuitry. Information representing the blankout pattern image is applied to the detection circuitry to enable the system to ignore all video during the time represented by the blankout portion of the frame.

Although the chip was in perfect alignment with the compliant tape window and zones Z1–Z16 at the end of the sequence of operations described with reference to FIG. 3C, the mechanical operation of picking up the semiconductor chip into contact with the compliant tape is not an exact one; and the chip may become misaligned with respect to the tape during the pickup operation. In practice, this misalignment is found to happen sufficiently often that the automatic alignment system advantageously should analyze whether it did indeed happen and, if it did, realign the reference zones to the chip. This analysis and realignment is accomplished through images of the type shown in FIG. 3D in the following manner.

In FIG. 3D, both the beam leads and the material of the compliant tape surrounding the window produce white video. Accordingly, those portions of the beam leads extending beyond the edge 63–66 of the tape window are not distinguishable. For this reason they are shown as broken lines 76A. For Y alignment, the amount of white video outside blankout pattern Z19 and within inner zones Z6 plus 27 is balanced against the white video outside the blankout pattern and within zones Z10 plus Z11. For X alignment, the amount of white video outside blankout pattern Z19 and within zones Z6 plus Z10 is balanced against the amount of white video outside the blankout pattern and within zones Z7 plus Z11.

Since skewing of the chip with respect to the tape is often a problem in the pickup operation, the pattern of zones Z1–Z16 advantageously should, in the operation of FIG. 3D, also be aligned with the chip in the $\theta$ or rotary direction. Inasmuch as it is not simple or feasible to artificially generate skewed lines in a rectilinear scan television, no rotation of the pattern of zones actually is performed. However, any misalignment of the chip with respect to the pattern of zones is noted and compensated for in the following manner.

A pattern including a pair of additional zones, Z20 and Z21 is generated with upper edges coincident with the lower edge of blankout pattern Z19. For analysis of $\theta$ alignment, the white video coincident with zone Z20 is compared with the white video coincident with zone Z21. As before, the comparison can be effected by charging separate capacitors during the time that white video is coincident with zones Z20 and Z21. However, in this case the differential charges developed on those capacitors is not used to drive motors to skew the pattern of reference zones, but rather is merely stored to effectively cause a compensating skewing of the video image of the substrate with respect to the patterns in the next operation depicted in and described with reference to FIG. 3E.

Figure 3E:
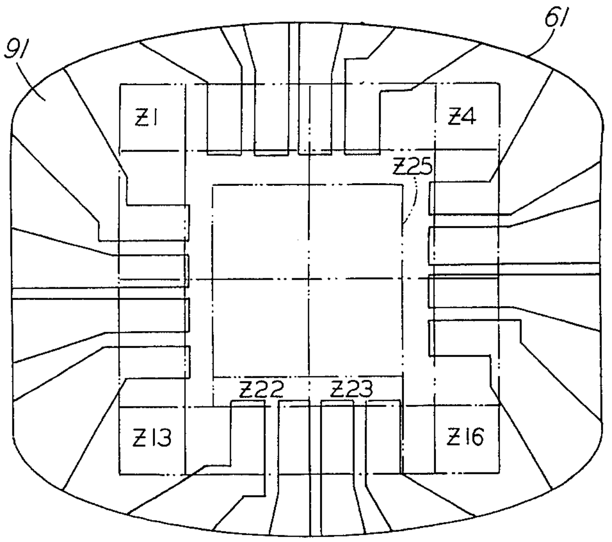

In FIG. 3E there is shown a schematic representation of a TV monitor image of the conductor patterns 91 on a substrate to which the semiconductor chip is to be bonded. As in the prior alignment operations, the pattern of zones Z1–Z16 is superimposed upon the image of conductor patterns 91.

As was discussed with reference to FIG. 1, to align the substrate to the reference zones, the substrate is directly illuminated with slant illumination by a light source 51 along a path 59. This is in contradistinction to the prior alignment operations wherein the workpieces were indirectly vertically illuminated through the prism 48. The purposed of this slant illumination is to cause the conductive patterns 91, which are gold and which would usually thus appear white on the video image, to appear to be black. This is done to compensate for the fact that the conductive patterns often include contamination and irregular portions which would show up black on the TV monitor and would thus tend to cause errors in the automatic alignment operation. Most significant types of contamination on the conductive patterns when viewed as black also appears to be black and thus cause no problem.

Thus, using a black video detection, the amount of black video coincident with zones Z6 plus Z7 is balanced against the amount of black video coincident with zones Z10 plus Z11 to effect a Y alignment. Similarly, the amount of black video coincident with zones Z6 plus Z10 is balanced against the amount of black video coincident with zones Z7 plus Z11 to effect an X alignment. As in the prior operations, a pair of additional zones Z22 and Z23 are generated to have upper edges coincident with the lower edge of an artificial blankout pattern Z25, and lower edges coincident with the upper edges of zones Z14 and Z15. The important factor is that zones Z22 and Z23 be of sufficient vertical extent that a portion of patterns 91 coincide therewith both in and out of alignment.

For $\theta$ correction, the amount of black video coincident with zone Z22 is balanced against the amount of black video coincident with zone Z23 in a manner analogous to that described with respect to previous alignment operations, i.e., by gating high frequency pulses to capacitors and equalizing the voltages developed thereon.

However, as will be remembered from the discussion with respect to FIG. 3D, charge was stored in capacitors to represent the rotary misalignment, if any, of the semiconductor chip with respect to the reference zones Z20 and Z21. To utilize this stored information, the charge stored in capacitors in the operations with respect to FIG. 3D is subtracted from the charge stored in the capacitors during the operations of FIG. 3E so that accurate rotary alignment can be effected.

Alternatively, of course, information from FIG. 3D representing rotary misalignment could be stored in a variety of other ways such as by a particular value of a variable impedance.

PATTERN GENERATION AND VIDEO DETECTION AND ANALYSIS CIRCUITS

In conventional rectilinear scan vidicons each frame is controlled, i.e., initiated, by one signal, called a vertical sync pulse. Within each frame, each scan line is initiated by a horizontal sync pulse. Typically there are 60 frames per second and at least 200 scan lines per frame. The lines may, but need not be, locked or synchronized with respect to the vertical sync pulse.

Assume now that it is desired to generate one or a plurality of rectangular white zones on an otherwise black background. It should be readily seen that such generation of white rectangular zones can be accomplished by controlling the voltage on successive appropriate ones of the scan lines to produce a white image during the appropriate part of each of the successive scan lines. In this manner there will be produced a white rectangular zone comprising white portions of successive scan lines. This control of voltages, in turn, can be accomplished by initiating a timer with the vertical sync pluse to produce a delayed pulse to determine which horizontal scan lines are to be used. Each horizontal sync pulse corresponding to the appropriate scan lines in turn can initiate a delayed pulse to produce the voltages to cause the white images, as desired. pulse Pattern generation circuit 54 and the coincidence detection analysis circuit 55 of FIG. 2 can be embodied in specific logic circuitry using the above-set forth philosophy of white rectangular zone generation and will now be described in detail with reference to FIGS. 4–10.

FIG. 4 shows logic circuitry responsive to the horizontal and vertical sync pulses from a vidicon camera 41 for generating a pattern of white rectangular reference zones such as are illustrated in the foregoing figures. FIG. 4 additionally includes video amplifiers and detectors interconnected with such logic circuitry for effecting the superimposed displays illustrated in and described with respect to FIGS. 3A–3E.

As shown in FIG. 4, the horizontal and vertical sync pulses from vidicon 41 are first applied along lines 38 and 39 to a sync pulse shaper 101, which may be any conventional pulse-shaping circuit, to reshape these pulses into sharply defined rectangular waveforms. The shaped vertical sync pulse then is applied to a first variable-pulsewidth, one-shot multivibrator ID1.

A one-shot multivibrator, also known as a monostable multivibrator or a delay flip flop, is a logic circuit which produces a pulse of controlled duration in response to application of a predetermined input signal. The duration of the pulse produced by a one-shot multivibrator, such as ID1, is controllable by adjusting a variable resistor, such as either resistor 103 or 104. As seen, either resistor 103 or 104 is connected to ID1 through a switch 102. Resistor 103 is a motor-controlled resistor, being controlled by motor 105 for automatic operation. Resistor 104 is a manually adjustable resistor.

Multivibrator ID1 is adapted to be triggered by the trailing or descending edge of an input pulse to produce a rectangular pulse of duration controlled by the variable resistors 103 or 104, depending upon the position of switch 102. The output of multivibrator ID1 is applied to the input of a second multivibrator ID2, which, like all other multivibrators referred to hereinbelow, is adapted to produce a pulse of controlled duration in response to a trailing edge of an input signal, the control being provided for ID2 by a variable resistor 139. The output of ID2 is applied to a first multivibrator NL1 in a succession of four serially connected multivibrators NL1–NL4, each of which is adapted to produce a pulse of controllable duration in response to a trailing edge of an input signal pulse.

Figure 6:
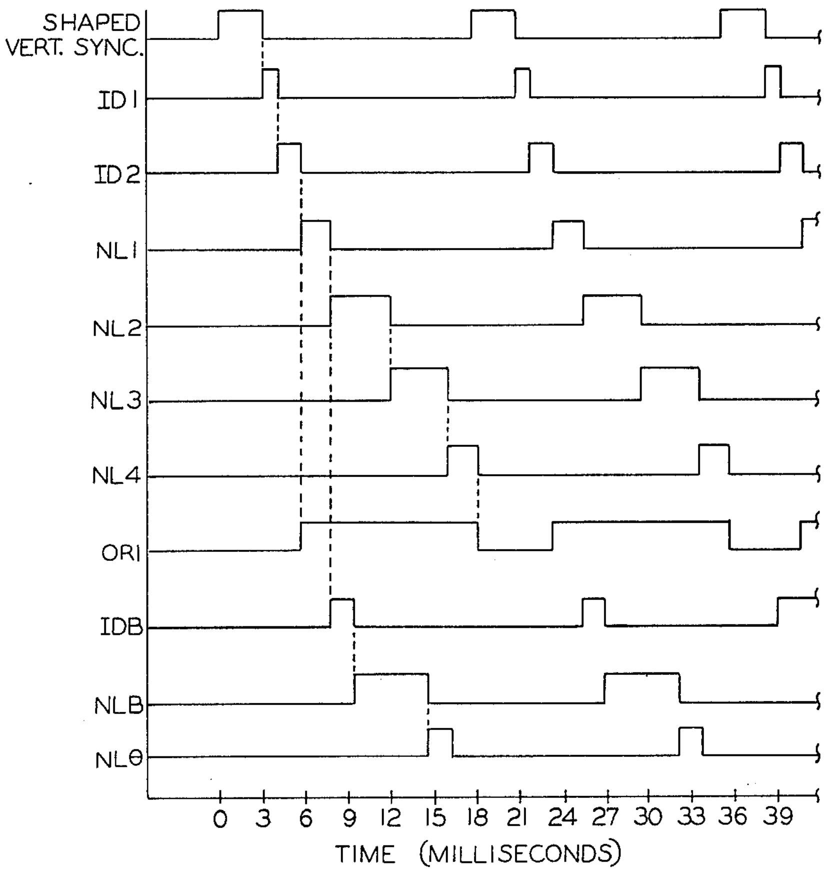
FIGS. 6 and 7 are voltage waveform diagrams depicting the time relationships among the more significant nodes of the circuit of FIG. 4.

These pulse productions and relationships will be more readily understood from FIG. 6, which shows a waveform diagram of the pulses, in a millisecond scale, which are initiated by the shaped vertical sync pulse from shaper 101. As seen in FIG. 6, the expiration of the shaped vertical sync pulse which lasts about 3 milliseconds, triggers ID1 to produce a pulse of about 1 millisecond duration. The trailing edge of the ID1 pulse triggers ID2 to produce a pulse lasting about 1.5 milliseconds. The trailing edge of the ID2 pulse trigger NL1 to produce a pulse lasting about 2 milliseconds. In sequence then, the trailing edge of the NL1 pulse triggers multivibrator NL2 to produce a pulse lasting about 4 milliseconds; the trailing edge of the NL2 pulse triggers multivibrator NL3 to produce a pulse lasting about 4 milliseconds; and the trailing edge of the NL3 pulse triggers multivibrator NL4 to produce a pulse lasting about 2 milliseconds. The duration of pulses produced by multivibrators NL1–NL4 is controlled by corresponding variable resistors 106–109, respectively.

As seen from FIG. 4, the respective outputs A–D, of multivibrators NL1–NL4 are applied to the inputs of an OR gate labeled OR1, the output of which is applied to one input of a NAND gate NG1. The OR gate, OR1, serves only as a mixer or combiner to combine the outputs of NL1–NL4 and apply them to the input of NAND gate NG1.

Also applied to another input of NAND gate NG1 is the shaped horizontal sync pulse from shaper 101. As seen, the shaped horizontal sync pulse is first applied to a multivibrator JR1 to remove jitter from the pattern display generated by the circuit of FIG. 4. Typically, the jitter removing delay multivibrator JR1 is adjusted to produce, in response to the trailing edge of a shaped horizontal sync pulse, a sharply defined rectangular pulse of duration only about 1 microsecond.

NAND gate NG1 is a positive logic NAND gate whose output is at a high level at all times except when both of its inputs are at a high level, in which case the output of NG1 switches to a low level. The descending from high to low is used to trigger a multivibrator LD1 to produce a pulse of controlled duration. The duration of the pulse produced by multivibrator LD1 is controllable by either of a pair of variable resistors 110 or 111, depending upon the position of a switch 112. As further seen, variable resistor 110 is controlled by a motor 113.

Coupled to the output of multivibrator LD1 is the input of a first multivibrator LL1 in a cascaded succession of four multivibrators LL1–LL4, the respective outputs of which are labeled E–H. The duration of the pulse produced by each of the multivibrators LL1–LL4 is controlled by variable resistors 114–117, respectively. Outputs E–H of multivibrators LL1–LL4 are combined through an OR gate, OR2, and applied through a steering diode 118 to one input of a video monitor 119.

The circuitry mentioned up to this point with respect to FIG. 4 is sufficient for producing electronic signals representing zones Z1–Z16 in FIGS. 3A–3E and 5A. The outputs of multivibrators ID1, ID2 and NL1–NL4 each occur at a controllable time period after the trailing edge of the shaped vertical sync pulse. Thus, the duration of any one of the pulses produced by those multivibrators can be controlled to occur during any particular time period comprehending any desired successive ones of the horizontal scan lines. Further, by combining the presence of any one of these pulses with the presence of the horizontal sync pulse (through NAND gate NG1 and OR gate OR1), timers such as LD1 and LL1–LL4 are initiated to control the application of voltages to produce white video along any desired portions of the successive scan lines.

Figure 7:
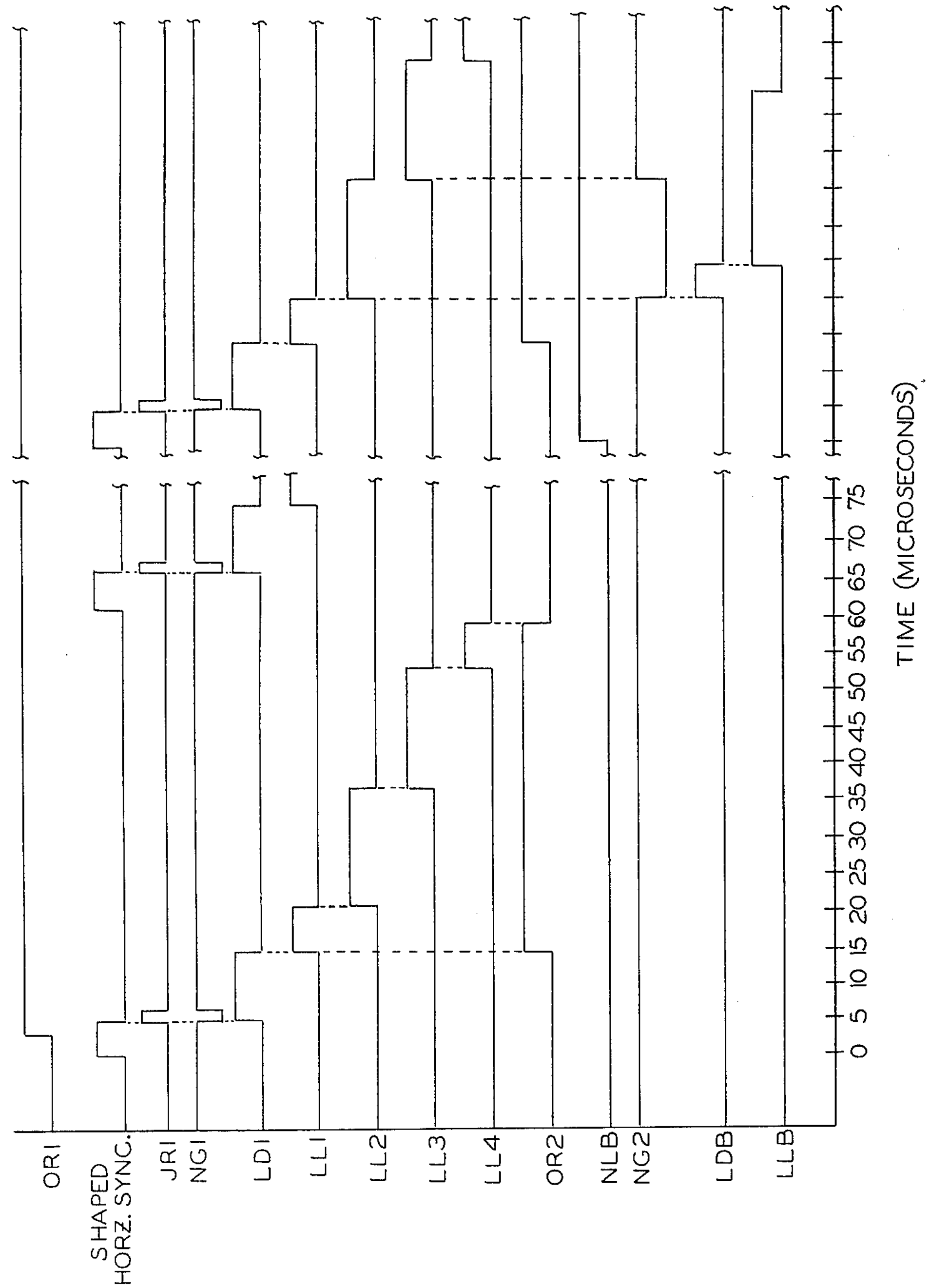

FIG. 7 is a waveform diagram depicting the outputs of LD1 and LL1–LL4 and various other pertinent outputs which occur on a microsecond time scale, as initiated by the horizontal sync pulse. As seen at the top of FIG. 7, with OR1 on, a shaped horizontal sync pulse, which triggers multivibrators JR1 to produce a 1 microsecond pulse, results in both inputs of NAND gate NG1 being high. Accordingly, the output of gate NG1 goes from its normally high level to a low level, lasting one microsecond in correspondence with the pulse from JR1.

When NG1 goes from high to low, multivibrator LD1 is triggered to produce a pulse lasting about 9 microseconds. The trailing edge of the LD1 pulse triggers multivibrator LL1 to produce a pulse lasting about 6 microseconds; and in sequence the trailing edge of the LL1 pulse triggers multivibrator LL2 to produce a pulse lasting about 16 microseconds; the trailing edge of the LL2 pulse triggers multivibrator LL3 to produce a pulse lasting about 16 microseconds; and the trailing edge of the LL3 pulse triggers multivibrator LL4 to produce a pulse lasting about 6 microseconds. Of course, the pulses produced by LD1 and LL1–LL4 all occur along a single horizontal scan line. During each scan line, the pulses from LL1–LL4 on outputs E–H, respectively, produce white video on monitor 119 for the amount of time corresponding to each of those pulses.

Since OR1 remains on for 12 milliseconds (12,000 microseconds), a great plurality of successive horizontal sync pulses, e.g., at about 60 microsecond intervals, produce white video on successive scan lines synchronized with that produced on the one scan line described in detail. The result is zones Z1–Z16 as discussed above.

In more detail now with respect to FIGS. 5A–5C, FIG. 5A shows the pattern of zones Z1–Z16, along with a blankout zone Z19 and θ-zones Z20 and Z21 shown in phantom lines. From the foregoing discussion, it should be appreciated that zone Z1 represents that amount of time in which both NL1 and LL1 are on. Zone Z2 represents that period of time when both NL1 and LL2 are on. In like manner, each of zones Z1–Z16 is produced by a coincidence of one of multivibrators NL1–NL4 and one of multivibrators LL1–LL4.

As a conceptual aid, FIG. 5C shows an AND gate having inputs X and Y and an output Z; and FIG. 5B shows a table or chart indicating the particular X and Y inputs needed to produce a particular Z or zone output from the AND gate of FIG. 5C. For example, as shown in the chart of FIG. 5B, a pulse on output Z, representing the amount of time which zone Z1 is on, is produced by combining output A of multivibrator NL1 as input X with output E of LL1 as input Y. Similar combinations to produce each of zones Z1–Z16 will be apparent from FIG. 5C.

As seen in FIGS. 3D and 5A, blankout zone Z19 occurs during a part of the time interval taken up to zones Z6, Z7, Z10, and Z11. This fact is used in that zone Z19 is generated by initiating timers at the beginning of zone Z6 to control the video on desired portions of successive horizontal scan lines to produce the blankout pattern. More specifically with reference to FIG. 4, the input of a multivibrator IDB is coupled through a normally open switch 123 to the output A of multivibrator NL1. An additional multivibrator NLB has its input coupled to the output of IDB. The output of multivibrator NLB is coupled through a steering diode 124 to one input of a NAND gate NG2. The output F of multivibrator LL2 is coupled to the other input of NAND gate NG2.

It will be appreciated that the upper left hand corner of zone Z6 is represented by the instant at which NL2 is on and LL2 just turns on. Further, blankout zone Z19 begins, on each horizontal scan line, a fixed period of time after the beginning of zone Z6. This fixed period of time is provided by a multivibrator LDB having its input connected to the output of gate NG2.

When LL2 turns on, i.e., at the beginning of zone Z6, NG2 switches from high to low, resulting in a pulse at the output of multivibrator LDB. When multivibrator LDB turns off, the trailing edge of the LDB pulse is coupled to a line length time LLB, initiating a pulse therefrom. The LLB pulse determines the line length in the blankout zone Z19 and so affects all horizontal lines which occur during the time when the number of lines timer NLB is on.

As seen, the polarity of the LLB pulse is inverted through an inverting amplifier 125 and then provided through a steering diode 126 to the same input of the video monitor 119 to which the outputs E–H of multivibrators LL1–LL4 are connected. Because the output of LLB is inverted, the effect of signals applied therefrom to monitor 119 is to cancel out the effect of the signals from multivibrators LL1–LL4. Thus, those signals from LL1–LL4 are effectively "blanked out"; and, as will be appreciated below, no coincidence of video from vidicon 41 (FIGS. 1 and 4) will be detected during the blanked out interval.

FIGS. 6 and 7 depict the waveform diagrams for the outputs of the immediately above-described circuitry for generating the blank-out pattern. Assuming blankout is desired and switch 123 is closed, FIG. 6 shows that multivibrator IDB turns on at the expiration of number of lines timer NL1. The trailing edge of the IDB pulse triggers the NLB timer which remains on for abo ut 5 milliseconds to determine the number of lines, i.e., horizontal scan lines, which make up blank-out zone Z19.

FIG. 7 shows that if NLB is on, NAND gate NG2 switches from high to low at the beginning of the LL2 pulse. This triggers line delay timer LDB to produce a pulse lasting about 4 milliseconds. The trailing edge of the LDB pulse triggers line-length timer LDB to produce a pulse lasting about 24 microseconds to determine the horizontal scan-line length for the blank-out pattern. Of course, since NLB remains on for 5 milliseconds, successive horizontal sync pulses also result in LDB and LLB producing pulses to blank out corresponding portions of successive horizontal scan lines until the NLB pulse expires.

Also shown in FIG. 4 is circuitry for generating the zones Z20 and Z21 in FIGS. 3D and 5A for enabling alignment in the rotary or θ direction. Due to the location and size of zones Z20 and Z21, being immediately below and commensurate in length with blankout zone Z19, zones Z20 and Z21 advantageously are initiated by the trailing edge of the NLB pulse, which determines the last scan line to be included in zone Z19.

As seen, the output of number of lines timer NLB is coupled through another normally open switch 127 to the input of a multivibrator NLθ which, if switch 127 is closed, is triggered by the trailing edge of the NLB pulse to produce a pulse (FIG. 6) whose duration (nominally about 1.5 milliseconds) determines the number of scan lines comprising zones Z20 and Z21. The length of each horizontal scan line within zone Z20 and Z21 is controlled by line length multivibrators LL2, LL3 and LLB. To this end, output F of LL2 is coupled to an AND gate AG1 along with the output of LLB and the output of timer NLθ; and output G of LL3 is coupled to another AND gate AG2 along with the output of LLB and of NLθ. Thus, the output of AND gate AG1 is high only during the duration of zone Z20, i.e., only when NLθ, LLB, and LL2 are on. Similarly, the output of AND gate AG2 is high only during the duration of zone Z21, i.e., only when NLθ, LLB and LL3 are on.

Zones Z17 and Z18 for the rotary alignment described with reference to FIG. 3C and zones Z22 and Z23 for the rotary alignment described with reference to FIG. 3E also advantageously are generated in the manner described immediately above for zones Z20 and Z21. However, since blankout patterns are not used in the alignment operations described with reference to FIGS. 3C and 3E, they are shown as phantom zones Z24 in FIG. 3C and Z25 in FIG. 3E. Circuitry for generating zones Z17, Z18, Z22 and Z23 is not illustrated and will not be further described inasmuch as it is entirely analogous to that described for generating zones Z20 and Z21.

Having described in detail the circuitry for generating the patterns of reference zones and the advantageous relationships of those zones to the workpieces, there will now be described particular embodiments of circuitry for detecting, analyzing and utilizing detected coincidence between the zones and the images of the workpieces.

Electronic signals representing the video image of the workpiece such as the semiconductor chip or substrate produced by vidicon 41 (FIG. 4) are communicated along line 40 to a video amplifier 131 having controllable gain and appropriate filtering functions and then to both of a pair of video detectors, 132 for detecting white video and 133 for detecting black video. The outputs of video detectors 132 and 133 are in digital form with a high level indicating a strong white signal and a low level indicating a strong black signal. Shades of gray from white up to a threshold level are detected as white and shades of gray beyond that threshold level toward pure black are detected as black. No levels of gray are considered in the automatic alignment system beyond that point. The electronic signal from vidicon 41 also are communicated along a separate line 135 directly to video monitor 119 so that a visual representation of what the vidicon is producing can be seen and monitored.

Video detectors 132 and 133 are enabled to detect only when OR gate OR2 is on, i.e., whenever anyone of multivibrators LL1–LL4 is on. This enabling is effected by coupling the output of OR2 through a separate steering diode 134 to an enable input on each of video detectors 132 and 133.

As seen in FIG. 4, signals representing detected white video or detected black video are coupled from detectors 132 and 133 along a pair of lines 136 and 137 to other parts (shown in FIG. 8) of the automatic alignment system. The signals on lines 136 and 137 also are coupled via switch 128, steering diode 129, switch 130, and, optionally, inverter 138 to monitor 119 to enable viewing of what is being detected and also, if desired, to enhance contrast of detected portions on the monitor.

Figure 8:
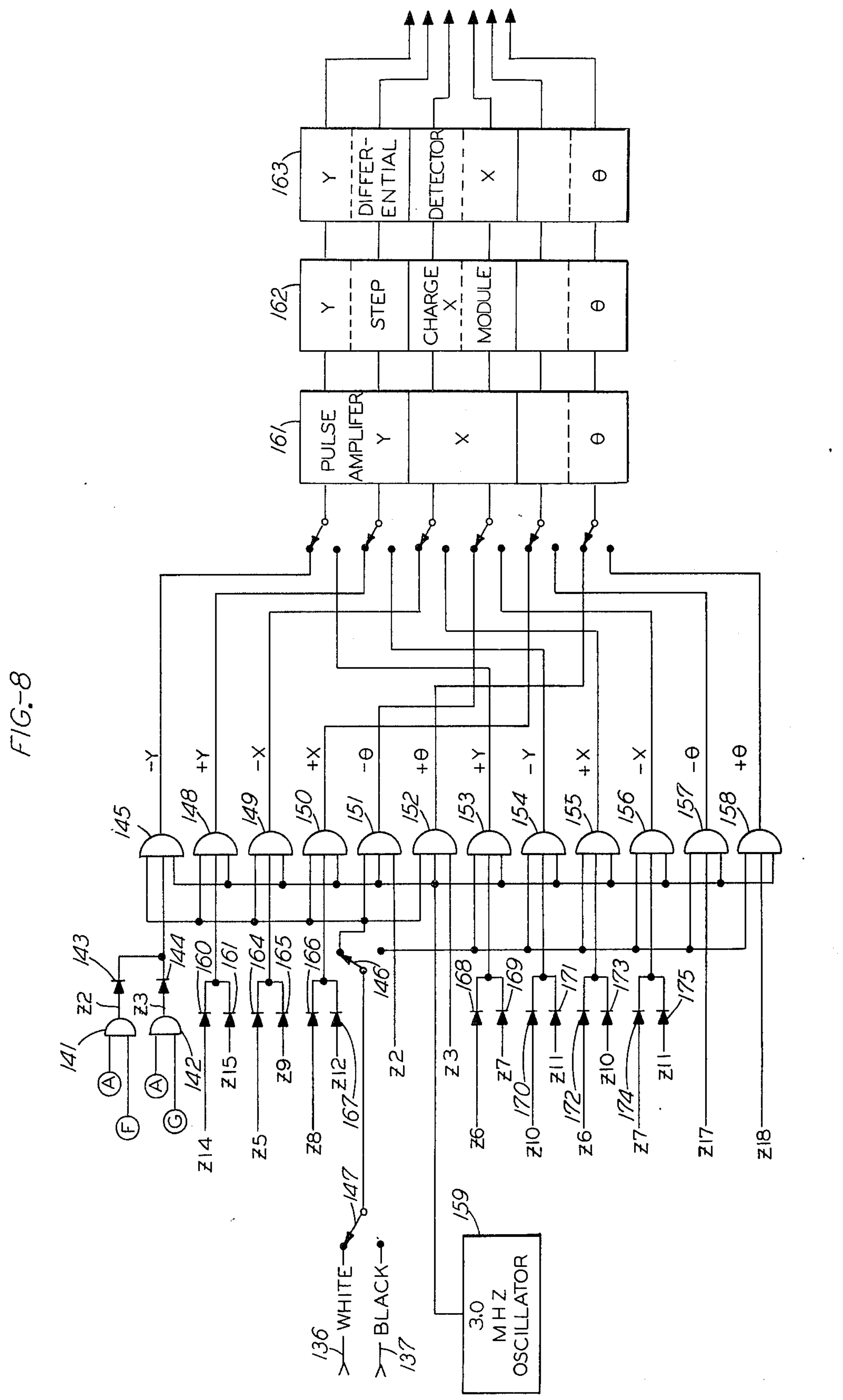
FIG. 8 is an electrical schematic block diagram of a circuit for sensing coincidence between the video images of the workpiece and the reference zones and for translating the sensed coincidence into signals for application to stepping motors for accomplishing actual alignment either of the reference zones to a workpiece or of the workpiece to the reference zones in accordance with this invention.

The circuit of FIG. 8 provides the function of detecting coincidence between the video representing the images of the workpieces and the electronic signals representing the reference pattern of zones. From the foregoing description with respect to FIGS. 4 and 5B it will be remembered, for example, that zone Z2 occurs when the output A of multivibrator NL1 and the output F of multivibrator LL2 are both at a high level. This combination can be detected with an AND gate 141 in FIG. 8 having its inputs coupled to outputs A and F and therefore producing a high signal, i.e., being on, only during the time when zone Z2 is on. Similarly an AND gate 142 has inputs coupled to the output A of NL1 and the output G of LL3 which are both high when zone Z3 is on. Accordingly the ouptu of AND gate 142 is high only when zone Z3 is on. AND gates 141 and 142 are coupled to a single input of an AND gate 145 through steering diodes 143 and 144, respectively, so that that input to AND gate 145 is high whenever either AND gate 141 or AND gate 142 is on.

For Mode 1 operation, i.e., in which the pattern of zones is to be aligned to the compliant tape window, illustrated in FIG. 3B, white video is detected and that detected white video on line 136 is coupled to a second input of AND gate 145 via switches 146 and 147. Coupled to a third input of AND gate 145 are signals from a three megaHertz pulse oscillator 159 which is also coupled to one input of a plurality of AND gates 148–158.

If either zone Z2 or Z3 is on and if white video is detected, pulses rom oscillator 159 are passed through AND gate 145 to a pulse amplifier 161 and from there to a particular one of a plurality of capacitors in a step charge module 162. In like manner, outputs representing zone Z14 and Z15 are coupled through steering diodes 160 and 161 to an input of AND gate 148, another input of which is coupled to a white video line 136 via switch 146. If either zone Z14 or Z15 is on and if white video is present at that instant in time, pulses from oscillator 159 are coupled through AND gate 148 to pulse amplifier 161 and from there to a different capacitor in module 162.

The outputs representing Z14, Z15 and all other zones can be derived with AND gates in the same manner as were the output representing zones Z2 and Z3, i.e., by coupling appropriate nodes of the circuit of FIG. 4 through AND gates like gates 141 and 142. For clarity and to avoid cluttering the drawing, such coupling is not illustrated in FIG. 8 for other than zones Z2 and Z3. The appropriate node-combinations for producing the respective zones are readily ascertainable from FIG. 5B.

As was discussed hereinabove, in Mode 1, i.e., where the pattern of zones is to be aligned to the compliant tape window, white video coincident with zones Z2 plus Z3 is balanced against the white video coincident with zones Z14 plus Z15 to align the pattern of zones in the Y direction with respect to the compliant tape window. Thus, if more white video is coincident with zones Z2 and Z3 than with zones Z14 and Z15, the pattern of zones must be moved downward for proper alignment. In this condition, the capacitor in module 162 charged through gate 145 will have received more pulses from oscillator 159 than will the capacitor charged through gate 148. The resultant voltage difference between those two capacitors is detected by module 163; and appropriate pulses are generated and applied by a conventional motor control circuit for a computer (not shown) tomotor 105 in FIG. 4 to change resistor 103 in a direction to increase the length of the pulse produced by ID1. This has the effect of moving the entire pattern structure downward without changing the size of any zone.

For X alignment in Mode 1, FIG. 8 shows outputs representing zones Z5 and Z9 coupled through steering diodes 164 and 165 to one input of an AND gate 149 and outputs representing zones Z8 and Z12 through steering diodes 166 and 167 to an input of another AND gate 150. Oscillator 159 and detected white video on line 136 are coupled to other inputs of gates 149 and 150.

If more white video is coincident with zones Z5 plus Z9 than with zones Z8 plus Z12, the pattern of zones must be moved to the right, i.e., in the +X direction. In this condition, the capacitor in module 162 charged through gate 149 will have received more pulses from oscillator 159 than will the capacitor charged through gate 150. The resultant voltage difference between those two capacitors is detected by module 163; and appropriate pulses are generated and applied by a conventional motor control circuit or a computer (not shown) to motor 113 in FIG. 4 to change resistor 110 in a direction to increase the length of the pulse produced by timer LD1. This has the effect of moving the entire pattern structure to the right without changing the size of any zone.

Although no $\theta$ alignment is done in Mode 1, FIG. 8 shows that such could be done by applying outputs representing zone Z2 to one gate 151 and zone Z3 to another gate 152, along with the detected white video and pulses from oscillator 159.

The foregoing alignment operations of Mode 1 are repeated over a plurality of vidicon frames in a closed loop fashion for maximum accuracy. In doing the operations over a plurality of frames, an averaging effect is realized due to the multiple alignments and realignments which are thereby accomplished. This averaging is even more effectivly realized if a random interlace is used with the vidicon. This random interlace refers to the position of the horizontal scan lines during each frame. The position changes as normal wobble in the 60 cycle line voltage, causes the horizontal scan lines to constantly move up and down. Commercial television cameras have both random interlace and odd-even interlace settings. Inexpensive industrial vidicons typically only have the random interlace which occurs due to the normal wobble of the 60 cycle line voltage. Interlacing is desirable inasmuch as it gives one an effect like a moving fan or a rolling venetian blind because the lines are not in the same place in successive frames and one can therefore effectively see underneath them and thus realize a much greater accuracy and precision in distinguishing features.

For Mode 2 operation in which a semiconductor chip is to be aligned to the pattern of reference zones, illustrated in FIG. 3C, white video is detected; and, as described above, zones Z6, Z7, Z10 and Z11 are used for the X and Y alignment.

This use is shown in FIG. 8 where outputs representing zones Z6 and Z7 are coupled through steering diodes 168 and 169 to one input of an AND gate 153; and outputs representing Z10 and Z11 are coupled through steering diodes 170 and 171 to an input of another AND gate 154. Detected white video on line 136 is coupled through switches 147 and 146 to other inputs of AND gates 153 and 154; and pulses from oscillator 159 are coupled to still other inputs of AND gates 153 and 154 to effect alignment in the Y direction.

If more white video is coincident with zones Z6 plus Z7 than with zones Z10 plus Z11, the chip must be moved upward in the video image, i.e., in the +Y direction. In this condition, the capacitor in module 162 charged through gate 153 will have received more pulses from oscillator 159 than will the capacitor charged through gate 154. The resultant voltage difference between these two capacitors is detected by module 163; and appropriate pulses are generated and applied to motor control circuit 30 in FIG. 1 to cause the +Y movement of the semiconductor chip.

For X alignment in Mode 2, FIG. 8 shows outputs representing zones Z6 plus Z10 coupled through steering diodes 172 and 173 to one AND gate 155 and outputs representing zones Z7 and Z11 coupled through steering diodes 174 and 175 to one input of another AND gate 156. Also coupled to the inputs of AND gates 155 and 156 are detected white video from line 136 and pulses from oscillator 159.

If more white video is coincident with zones Z6 plus Z10 than with zones 27 plus Z11, the semiconductor chip must be moved to the left, i.e., in the −X direction, for proper alignment. In this condition, the capacitor in module 162 charged through gate 155 will have received more pulses from oscillator 159 than will the capacitor charged through gate 156. The resultant voltage difference between these two capacitors is detected by module 163; and appropriate pulses are generated and applied to motor control circuit 30 in FIG. 1 to cause movement of the semiconductor chip in the −X direction.

For rotary ($\theta$) alignment in the Mode 2 operation described above with reference to FIG. 3C, the amount of white video coincident with zone Z17 is compared to the amount of white video coincident with zone Z18. FIG. 8 shows an output representing zone Z17 coupled to one input of an AND gate 157 and an output representing zone Z18 coupled to one input of an AND gate 158. Coupled to other inputs of gates 157 and 158 is detected white video, through switches 146 and 147 from line 136, and pulses from oscillator 159.

If the chip is skewed counterclockwise ($-\theta$) with respect to the patterns, then more white video (beam lead image) will be coincident with zone Z18 than with zone Z17. In this condition, the capacitor in module 162 charged through gate 158 will have received more pulses from oscillator 159 than will the capacitor charged through gate 157. The resultant voltage difference between these two capacitors is detected by module 163; and appropriate pulses are generated and applied to motor control circuit 30 (FIG. 1) to cause movement of the semiconductor chip in the clockwise ($+\theta$) direction.

Circuitry for effecting Mode 3 and Mode 4 alignments, i.e., where the pattern of zones is realigned to the chip in the tape and where the substrate is aligned to the pattern of zones, is entirely analogous to that shown in FIG. 8, and, for brevity, has not been illustrated.

Figure 9:
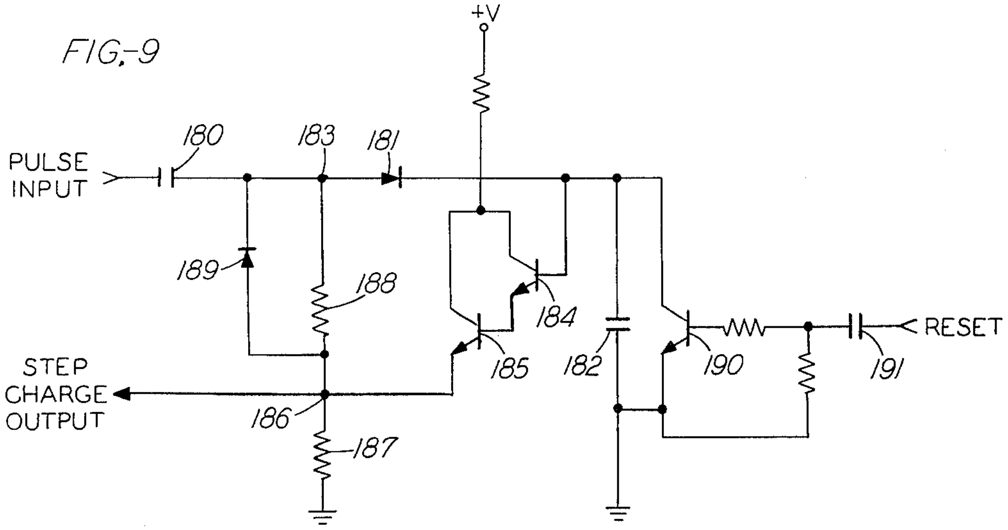
FIG. 9 is an electrical schematic representation of a step-charge circuit suitable for use in representing the amount of coincidence of the video image of the workpiece with the various reference zones in accordance with this invention.

With reference now to FIG. 9 there is shown a step-charge circuit suitable for inclusion as one of the plurality of storage circuits in the step-charge module 162 of FIG. 8. As seen, the input to the circuit of FIG. 9 is intended to be pulses which have been passed through one of the plurality of AND gates 145–158 in FIG. 8 from the oscillator 159. These pulses are applied, via a series connected coupling capacitor 180 and diode 181, to one plate of a storage capacitor 182, whose opposite plate is grounded. The ungrounded plate of capacitor 182 is connected back to the junction 183 between capacitor 180 and diode 181. This is done by means of transistors 184 and 185 connected in emitter-follower configuration and further connected to the junction 186 between resistors 187 and 188, which are in turn connected in series between ground and junction 183. A diode 189 parallels ungrounded resistor 188. Also connected to the ungrounded plate of storage capacitor 182 is the collector output of a transistor 190 whose base is supplied via coupling capacitor 191 with pulses from the multivibrator ID2 in FIG. 4.

Figure 10:
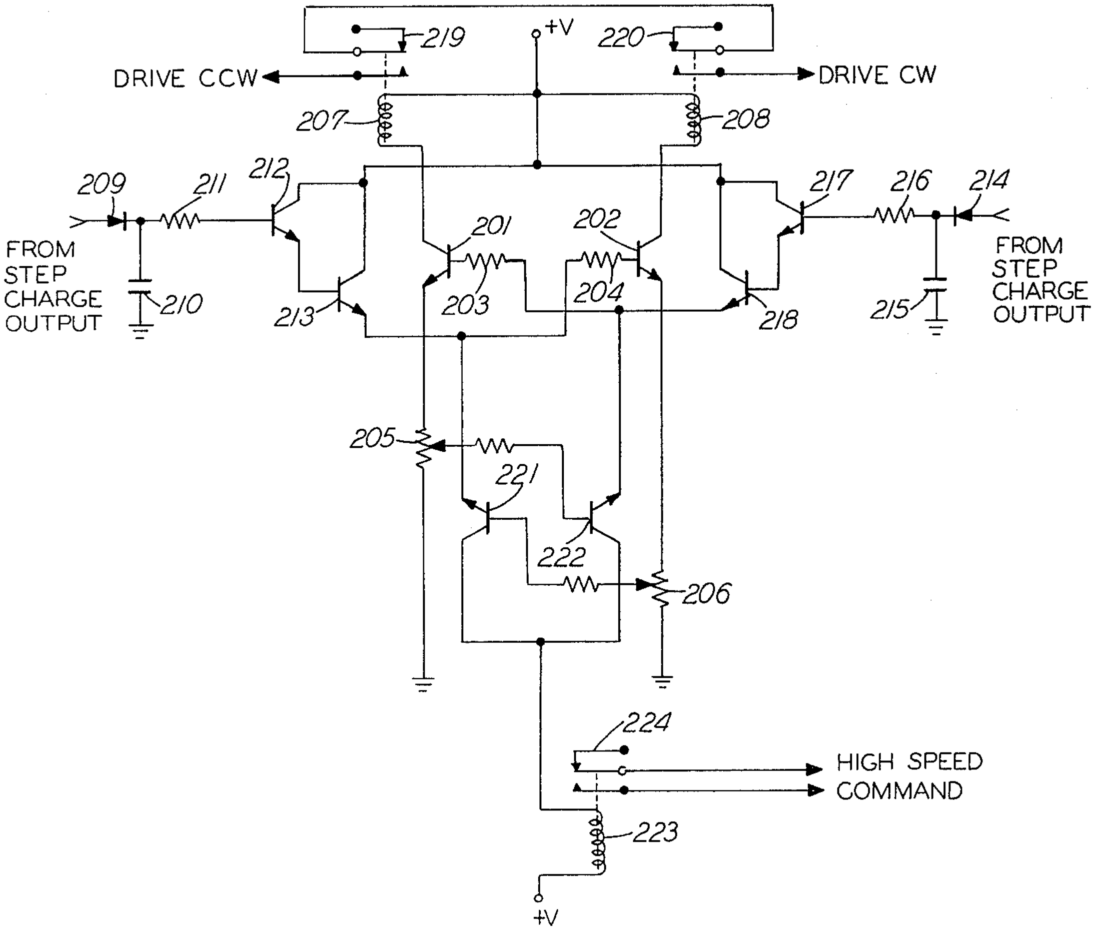
FIG. 10 is an electrical schematic diagram of a differential detector circuit for detecting coincidence as represented by charge on the various step charge circuits of FIG. 9 in accordance with this invention.

Storage capacitor 182 is so chosen in relation to the other time-constant determining parameters of FIG. 9 that its charging time constant is not appreciably longer, preferably shorter, than the period of the signal from oscillator 159 in FIG. 8. Consequently, each pulse from oscillator 159 is capable of charging the capacitor substantially completely. The corresponding voltage developed at junction 186 constitutes the output signal of the step-charge circuit of FIG. 9, which is then supplied to a differential detector such as shown in FIG. 10 in which will be described hereinbelow. In addition, this voltage also appears at junction 183 where it is clamped by diode 189. Successive pulses from oscillator 159 are therefore superimposed upon this feedback voltage, which represents the cumulative voltage-developing effect of prior oscillator pulses. The voltage developed across the capacitor 182 will therefore increase substantially in proportion to the number of pulses from oscillator 159, and so will the output signal from the step-charge circuit.

The pulse from multivibrator ID2 of FIG. 1, which is applied to transistor 190 through capacitor 191, drives that transistor into saturation, discharging storage capacitor 182 and, in effect, resetting the step-charge circuit for the next accumulation of pulse-representing output voltages, as determined by the number of pulses from oscillator 159. Thus, it is seen that the purpose of multivibrator ID2 in FIG. 4 is to initiate resetting of the step-charge circuits. To this end, the length the pulse produced by multivibrator ID2 is adjusted to ensure that, irrespective of the length of the pulse produced by multivibrator ID1, the step-charge circuits will have time to reset before the beginning of the first zone of the pattern of zones used for alignment. Such time, as can be seen from FIG. 6, need by only of the order of about 1 to 1½ milliseconds.

With reference now to FIG. 10 there is shown a differential detector circuit suitable for inclusion in differential detector module 163 of FIG. 8. As shown, the differential detector circuit includes first and second cross coupled emitter-follower transistors 201 and 202 having resistors 203 and 204 in the cross coupling paths. The emitters of transistors 201 and 202 are connected through resistors 205 and 206, respectively to ground; and the collectors are connected through relay coils 207 and 208, respectively to a voltage supply source, designated +V.

The voltage from the output 186 of a step charge circuit such as shown in FIG. 9 is coupled into one side of a differential detector through a peak-catching circuit including diode 209 and capacitor 210 and further through resistor 211 and through a pair of emitter follower transistors 212 and 213 connected in Darlington arrangement. Signals from the output of another step charge circuit to be compared to the signals from the first circuit are coupled to the other side of the differential detector through matching circuitry comprising a peak-catching portion having diode 214, capacitor 215 to ground, resistor 216 and a second emitter follower Darlington circuit comprising transistors 217 and 218.

Depending upon which of the outputs from the respective step charge circuits is the largest, one of transistors 201 and 202 will latch up, causing current to be drawn through only one of the two coils 207 and 208. Whichever coil is conducting current will cause the corresponding relay 219 or 220 to close, which as indicated in the drawing, is a signal for a motor to drive clockwise (cw) or counterclockwise (ccw).

Advantageously, the motors are preset to drive at a relatively slow speed with signals from relays 219 or 220. However, if the workpieces are sufficiently far out of alignment that a higher motor driving speed is desired, this condition will be indicated by a very large signal on one or both of the step charge circuits. This very large signal will cause sufficient voltage to be developed over either resistor 205 or 206 to turn on one of a second pair of emitter-follower transistors 221 and 222, causing current to flow through relay coil 223. This current flow through coil 223 causes relay 224 to close which indicates a high speed drive for the motors. The direction of drive for the motors is still indicated by the relay 219 or 220 which is still closed. The high speed drive continues until successive frames of video coincidence have been detected and analyzed and the voltage developed on the step charge circuits is insufficiently large to cause relay 224 to remain closed.

GENERAL DESCRIPTION OF ALIGNER EMBODIMENT

Figure 11:
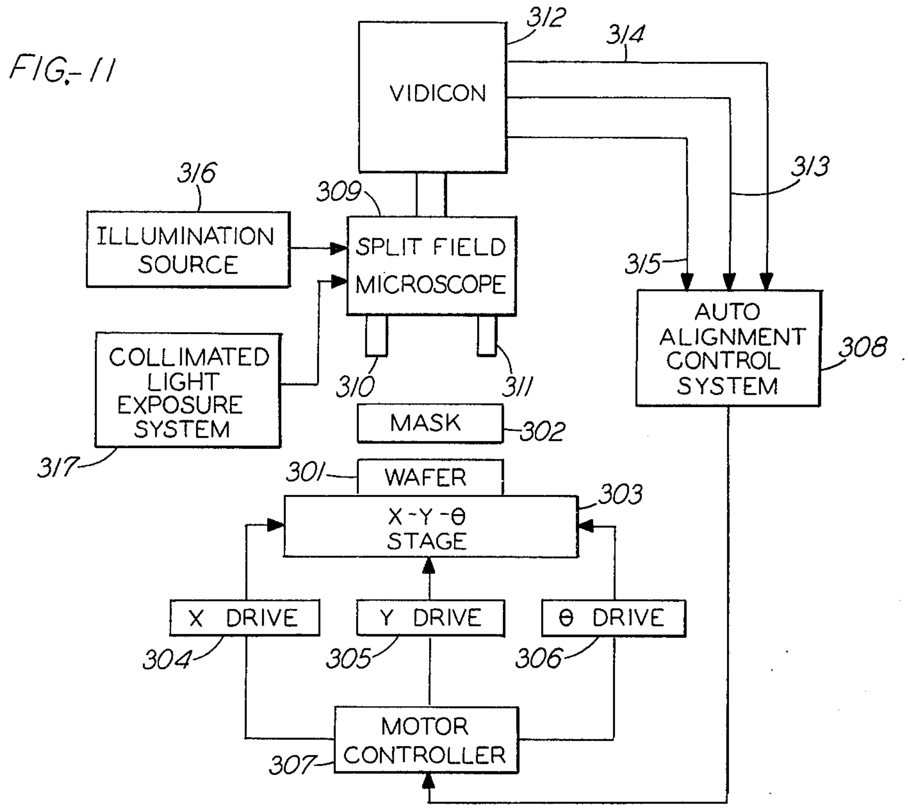
FIG. 11 is an electrical and mechanical block schematic diagram of apparatus for automatic video controlled alignment of semiconductor wafers or thin film substrates to photoresist masks in accordance with this invention.

With reference now to FIG. 11, there is shown an electrical and mechanical schematic block diagram of a video-controlled aligner in accordance with the second embodiment of this invention. The object of the apparatus of FIG. 11 is to align a semiconductor wafer 301 to a photoresist mask 302.

As shown the aligner includes a motor-controlled stage 303 on which the wafer is disposed. Stage 303 is driven by three independent motors, 304 for movement in the X direction, 305 for movement in the Y direction, and 306 for movement in the rotary or $\theta$ direction. Motors 304–306 are controlled by a motor control circuit 307 which may be in all respects identical to motor control circuit 30 of FIG. 1. Motor control circuit 307 is in turn controlled by an automatic alignment control system 308, analogous to control system 35 of FIG. 2.

A split field microscope 309; having objective lenses 310 and 311, provides microscopic images of separate portions of wafer 301 and/or mask 302 to a vidicon 312. A plurality of lines 313—315 couple the horizontal sync signals, the vertical sync signals, and electronic signals representing video images produced by vidicon 312 to the alignment control system 308.

An illumination source 316 provides light for viewing wafer 310 and/or mask 302; and a separate source 317 of collimated light is used for actual exposure of photoresist on wafer 301 through mask 302. In operation, with illumination source 316 operative, mask 302 is held rigidly in place while a wafer 301 is moved into alignment with mask 302. Then, light from source 316 is interrupted and collimated light from source 317 is applied through a separate part (not shown) of microscope 309 to the entire surface of mask 302 and wafer 301 to selectively expose portions of a photoresist coating (not shown) on wafer 301.

Figure 12A:
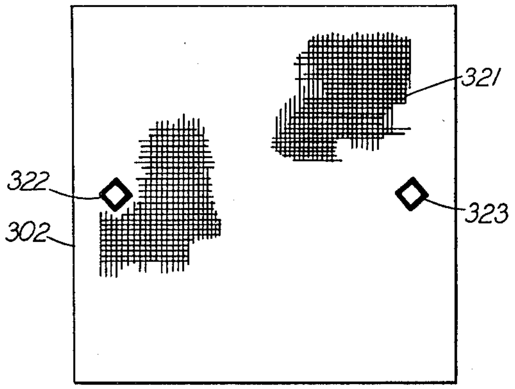
FIG. 12A is a somewhat schematic plan view of a photoresist mask.
Figure 12B:
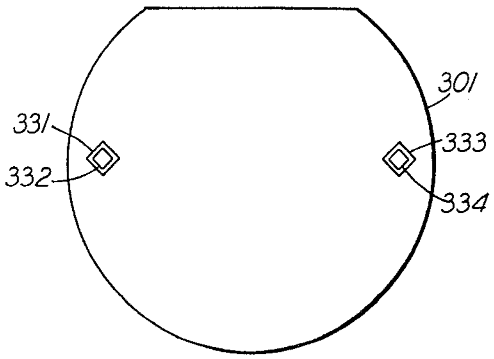
FIG. 12B is a plan view of a semiconductor wafer to be aligned to the photoresist mask of FIG. 12A.

For clarity of explanation, FIG. 12A shows a somewhat schematic plan view of a photoresist mask 302; and FIG. 12B shows a plan view of a semiconductor wafer 301 to be aligned to the photoresist mask of FIG. 12A. Mask 302 includes a great plurality of primary patterns 321 (indicated schematically only) in matrix form for defining the geometry of a corresponding great plurality of devices on wafer 301. Mask 302 additionally includes a pair of specially designed, diamond-shaped opaque fiducial marks 322 and 323.

Wafer 301 includes a corresponding pair of alignment features, established there in a prior masking operation, to which mask 302 is to be aligned. The alignment feature on wafer 301 to be aligned to mark 322 includes an outer diamond 331 and an inner diamond 332. The alignment feature to be aligned to fiducial mark 323 also includes an outer diamond 333 and an inner diamond 334. Alignment is accomplished by superimposing and positioning fiducial marks 322 and 323 between rectangle 331 and 332 and 333 and 334, respectively. This operation will be described in greater detail with reference to FIGS. 14A, 14B, 15A and 15B.

Figure 13:
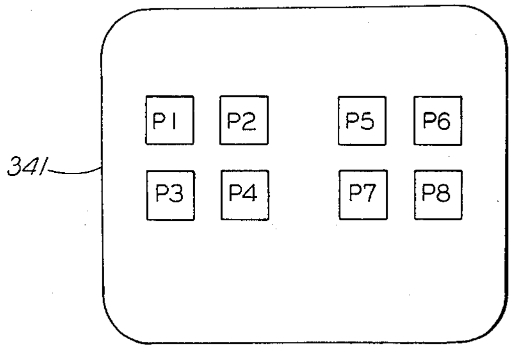
FIG. 13 illustrates an advantageous pattern of reference zones for use in automatically aligning semiconductor wafers or thin film substrates to photoresist masks in accordance with this invention.

Prior to that description, FIG. 13 shows an advantageous pattern of reference zones, as they appear if displayed on a TV monitor 341, for use in automatically aligning semiconductor wafers or thin film substrates to photoresist masks in accordance with this embodiment of this invention. As seen, zones P1–P8 include two sets of zones, P1–P4 and P5–P8, in opposite halves of the viewing area of monitor 341.

Figure 14A:
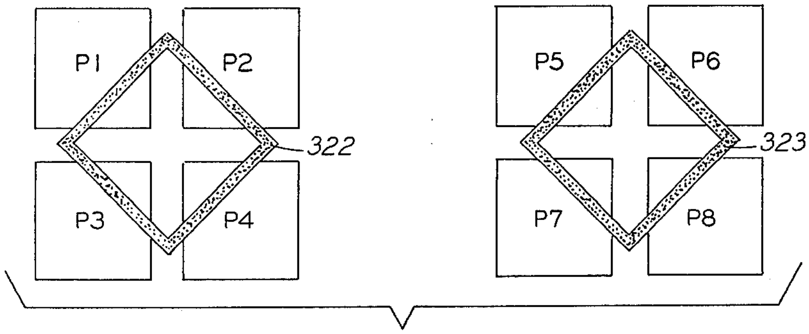
FIGS. 14A and 14B, respectively, illustrate the video image of the reference zones of FIG. 13 upon which are superimposed a video image of a pair of fiducial marks from the mask of FIG. 12A in alignment and out of alignment respectively.
Figure 14B:
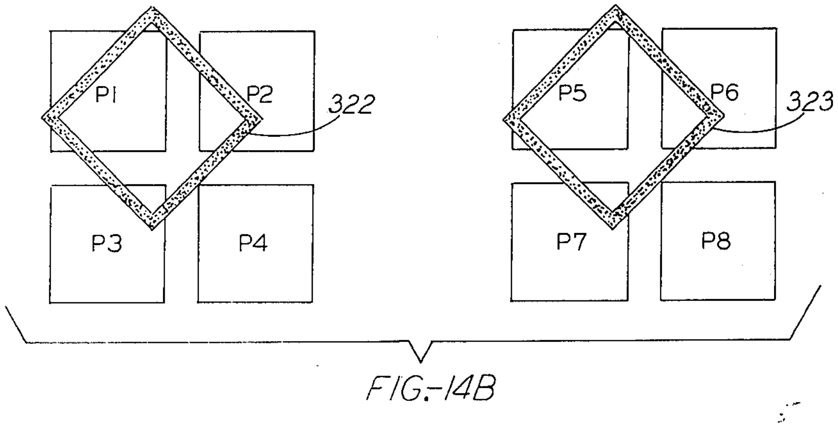

FIG. 14A shows the fiducial marks 322 and 323 of mask 302 superimposed upon and in perfect alignment with zones P1–P8. FIG. 14B shows fiducial marks 322 and 323 superimposed upon and out of alignment with zones P1–P8. In a manner analogous to that disclosed above with reference to the bonder embodiment, the pattern of zones P1–P8 are aligned to fiducial marks 322 and 323 by detecting the amount of black video from those fiducial marks coincident with each of the zones. Based on that coincidence, signals are generated and applied to stepping motors in logic circuitry employed to generate the zones to move the zones into the condition shown in FIG. 14A where the amount of black video coincident with each zone is equal. It should be appreciated that diamond-shaped features or other features having sides which are not parallel to the horizontal rectilinear scan lines of the vidicon are advantageous. The diamond shape is presently preferred.

If the zones P1–P8 were skewed with respect to the mask, i.e., with respect to fiducial marks 322 and 323, then alignment in the rotary or $\theta$ direction would be necessary. This alignment can be accomplished by simply moving the mask manually or under motor control until the misalignment is corrected. An alternate and preferred mechanism, however, is to generate zones P1–P4 through logic circuitry sufficiently independent of the circuitry which generates zones P5–P8 so that zones P1–P4 can be moved up and down independent of zones P5–P8. Such circuitry is disclosed hereinbelow with respect to FIG. 16 and is advantageous because as we described hereinabove, it is neither convenient nor feasible to generate rectilinear zones which are skewed with respect to the horizontal scan lines of a conventional rectilinear scan vidicon.

Figure 15A:
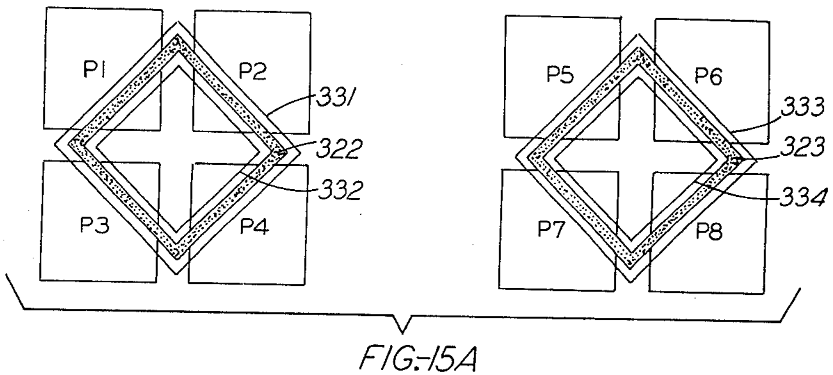
FIG. 15A depicts the video image of the reference zones upon which are superimposed the video image of the fiducial marks of the mask of FIG. 12A and also the fiducial marks on the semiconductor wafer or thin film substrate which is to be aligned to the mask, FIG. 15A depicting the described features in alignment.

FIG. 15A shows, superimposed upon zones P1–P8, fiducial marks 322 and 323 from mask 302 and also aignment features 331–334 of wafer 301. FIG. 15A shows rectangles 331 and 332 in perfect alignment with fiducial mark 322 and with zones P1–P4 and also shows rectangles 333 andn 334 in perfect alignment with fiducial mark 323 and with zones P5–P8. In this condition, the video image of features 322, 323 and 331–334 coincides with each of zones P1–P8 in an equal amount.

Figure 15B:
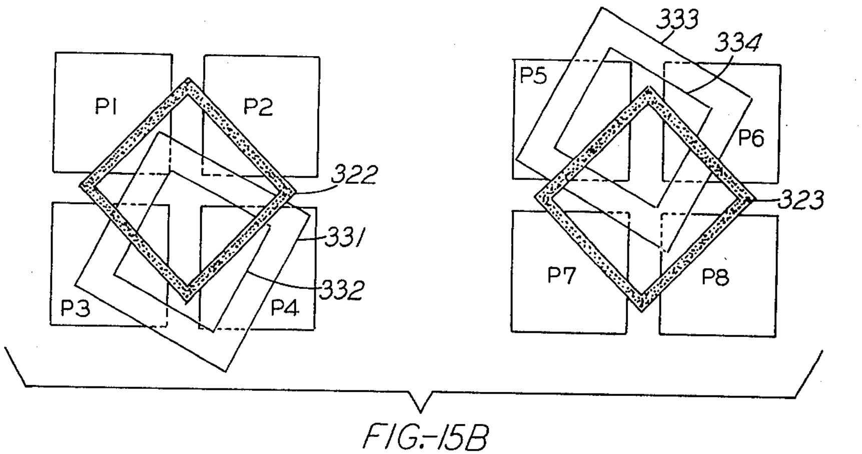
FIG. 15B depicting the described features out of alignment.

FIG. 15B shows the geometries of FIG. 15A out of alignment. As seen, fiducial marks 322 and 323 are in perfect alignment with zones P1–P8, having been so aligned in the operations described with reference to FIG. 14A and 14B. However, rectangles 331–334, and accordingly wafer 301, is out of alignment with fiducial marks 322 and 323 and, therefore of course also out of alignment with zones P1–P8. In the condition shown in FIG. 15B, considerably more video is coincident with zones P3, P4, P5 and P6, for example, than with the other zones. This unbalanced or unequalized coincidence of video, like the unequalized or unbalanced video discussed with reference to the bonder embodiment, can be used to gate signals from an oscillator to a plurality of storage capacitors corresponding to each zone or combinations of the zones. Voltages developed on those capacitors can be used to control the generation and application of signals to stepping motors 304–306 to move wafer 301, and hence the video images show in FIGS. 15A and 15B, into the condition shown in FIG. 15A.

Figure 16:
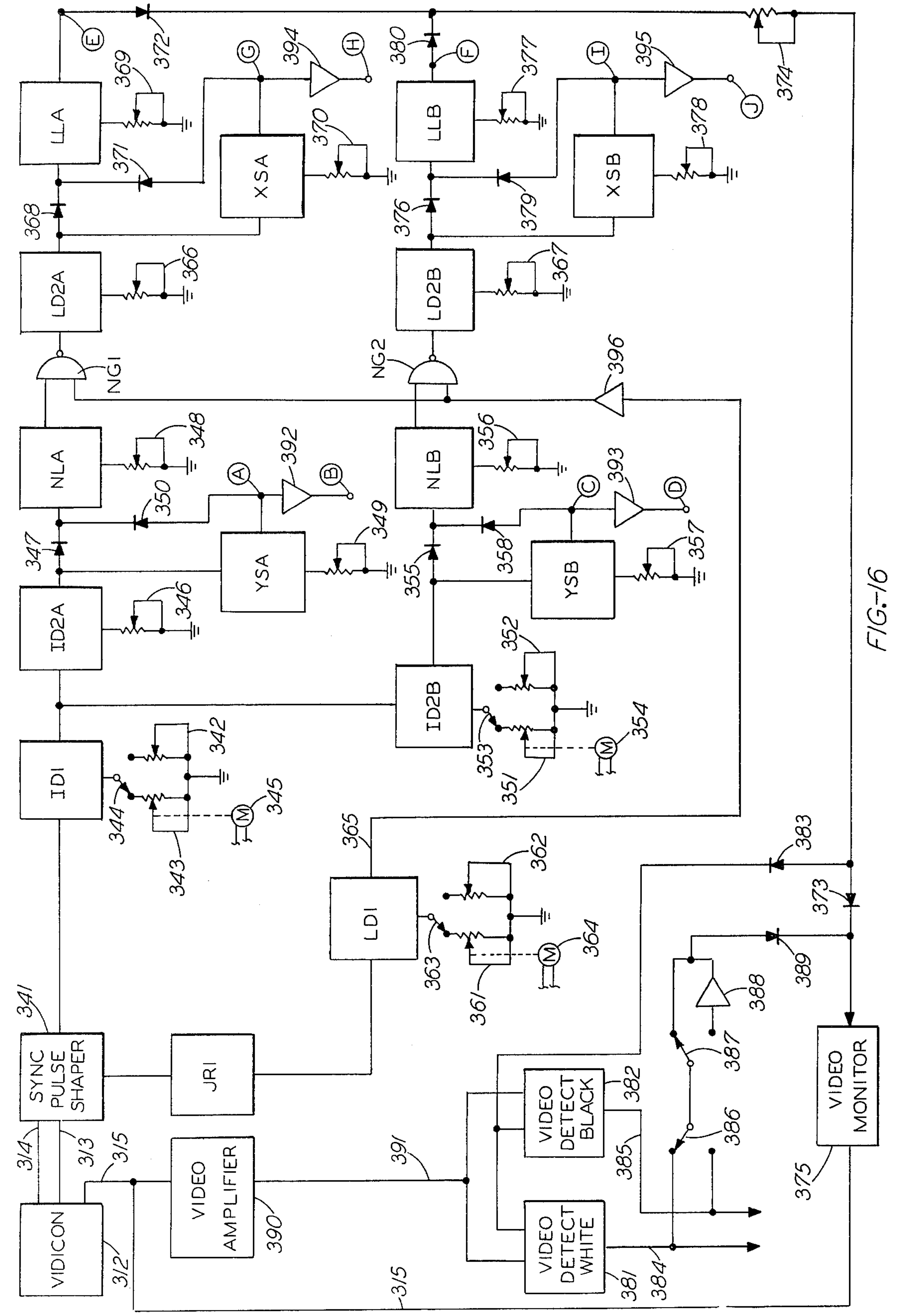
FIG. 16 is an electrical schematic block diagram of a logic circuit suitable for producing electronic signals representing zones of the pattern depicted in FIG. 13.

Circuitry for generating the pattern of zones P1–P8 is shown in FIG. 16. As shown, horizontal and vertical sync pulses from vidicon 312 are first applied along line 313 and 314, respectively, to a sync puulse shaper 341. The shaped vertical sync pulse then is applied to a first variable-pulsewidth, one-shot multivibrator ID1. The duration of the pulse produced by ID1 is controllable by adjusting a variable resistor, such as either of resistors 342 or 343, which are separately connected to ID1 through a switch 344. Resistor 343 is controlled by motor 345 for automatic operation. As were the multivibrators described with reference to FIG. 4 hereinabove, all multivibrators of the circuit of FIG. 16 are adapted to be triggered by the trailing or descending edge of an input pulse to produce a rectangular pulse of duration controlled by a variable resistor.

The output of ID1 is applied to the inputs of a pair of two additional multivibrators ID2A and ID2B, each of which is the first in a succession of multivibrators adapted for producing rectangular pulses which produce white video for the zones in each of the separate halves of the monitor viewing area, as described hereinabove. The duration of the pulse produced by ID2A is controlled by variable resistor 346. The output of ID2A is coupled through a steering diode 347 to the input of another multivibrator NLA whose pulse duration is controlled by variable resistor 348. The output of ID2A additionally is coupled to the input of another multivibrator YSA whose pulse duration is controlled by a variable resistor 349. The output of YSA is coupled through a steering diode 350 to the input of NLA.

The duration of the pulse produced by ID2B is controlled by either of a pair of variable resistors 351 or 352, depending upon the position of a switch 353. Variable resistor 352 is manually operable; and variable resistor 351 is operated by a motor 354. The output of ID2B is coupled through a steering diode 355 to a multivibrator NLB whose pulse duration is controlled by variable resistor 356. The output of ID2B also is coupled to a multivibrator YSB whose pulse duration is controlled by a variable resistor 357. The output of YSB is coupled through a steering diode 358 to the input of NLB.

The output of NLA is coupled to one input of a first NAND gate NG1; and the output of NLB is coupled to one input of a second NAND gate NG2. The other inputs of gates NG1 and NG2 are coupled through an inverter 396 to the output of a multivibrator LD1, the input of which is coupled to receive pulses from a multivibrator JR1. The input of JR1, a jitter removing delay, is coupled to receive shaped horizontal sync pulses from shaper 341. Multivibrator LD1, an initial line delay timer, produces, in response to the trailing edge of a JR1 pulse, a pulse whose duration is controlled by either of a pair of variable resistors 361 or 362, depending on the position of a switch 363. Variable resistor 361 is controlled by a motor 354.

Figure 17:
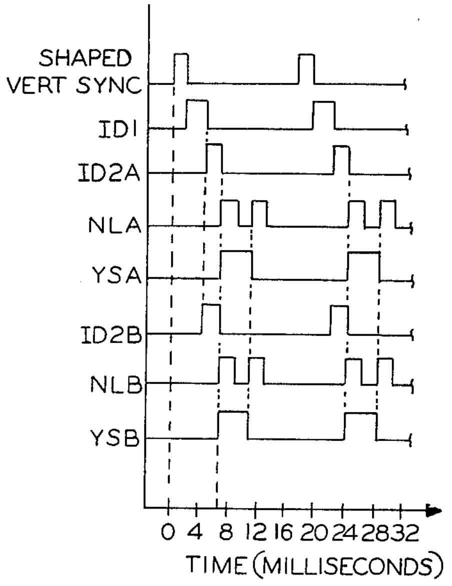
FIGS. 17 and 18 are voltage waveform diagrams depicting the time relationships between the voltages at the various nodes of the circuit of FIG. 16.
Figure 18:
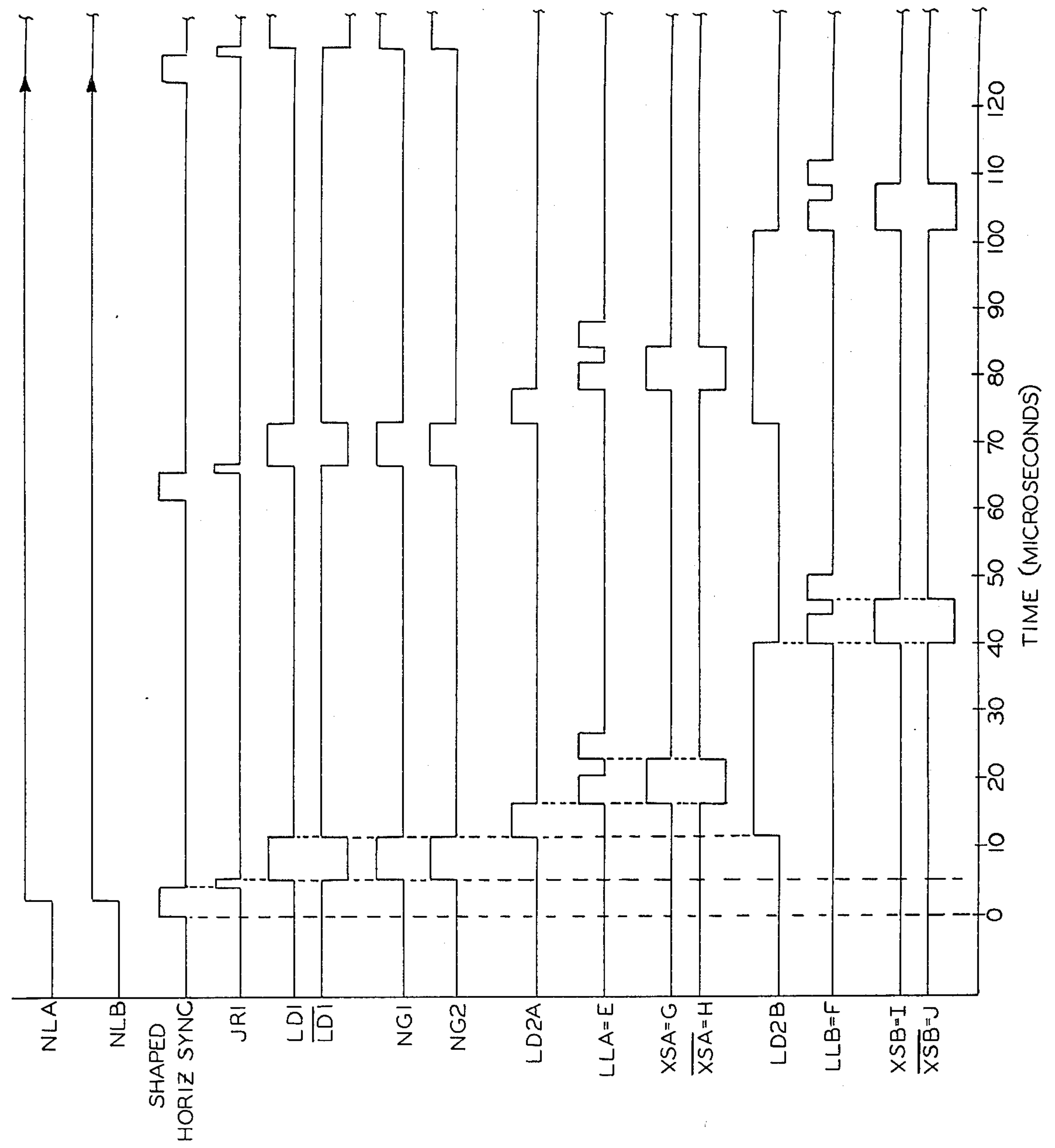

The pulse productions and relationships between the pulses will be more readily understood from the waveform diagrams shown in FIGS. 17 and 18. As seen, the trailing edge of the ID1 pulse triggers multivibrators ID2A and ID2B to each produce a pulse of duration about two milliseconds. The trailing edge of the ID2A pulse, through diode 347, triggers NLA to produce a first pulse lasting about two milliseconds and also triggers multivibrator YSA to produce a pulse lasting about four milliseconds. The trailing edge of the YSA pulse, through diode 350, retriggers NLA to produce a second pulse of the same duration as the first. The first pulse produced by NLA determines the position of the top and the vertical extent of zones P1 and P2. The second pulse produced by NLA determines the position of the top and the vertical extent of zones P3 and P4. The YSA pulse determines the vertical, or Y, separation between zones P1 and P3 and between zones P2 and P4.

The trailing edge of the ID2B pulse, through diode 355, triggers NLB to produce a pulse of duration about two milliseconds and also triggers YSB to produce a pulse of duration about four milliseconds. The trailing edge of the YSB pulse, through diode 358, retriggers NLB to produce another pulse of about two milliseconds. The first pulse produced by NLB determines the position of the top and the vertical extent of zones P5 and P6. The pulse produced by YSB determines the vertical, or Y, separation between zones P5 and P7 and between zones P6 and P8.

In the condition illustrated in FIG. 17, in which the NLA and NLB pulses are coextensive in time, i.e., occur at the same time and are of the same duration, the tops of zones P1, P2, P5 and P6 occur on the same horizontal scan line and those zones are of the same vertical extent, i.e., include the same number of successive horizontal scan lines. If the NLA and NLB pulses are not coextensive in time, the position and/or extent of zones P1–P4 will be different than that of zones P5–P8.

NAND gates NG1 and NG2 are enabled by pulses from NLA and NLB, respectively to pass any LD1 pulse which occurs while pulses from NLA and NLB are present. Gates NG1 and NG2 are positive logic NAND gates whose outputs are at a high level at all times except when all of their inputs are at a high level, in which case the output switches to a low level. The switching from high to low may be thought of as the trailing edge of a pulse; and this trailing edge can be used to trigger successive multivibrators to produce pulses of controlled duration.

The output of NAND gates NG1 and NG2 are coupled, respectively to the inputs of a pair of multivibrators LD2D and LD2B. The duration of the pulses produced by LD2A and LD2B is controllable by variable resistors 366 and 367, respectively. As can be better seen with reference to the waveform diagram of FIG. 18, the outputs of gates NG1 and NG2 are low except when an LD1 pulse is present. As $\overline{\text{LD1}}$, the inverted LD1 pulse, goes negative, NG1 and NG2 switch positive. When the LD1 pulse expires and $\overline{\text{LD1}}$ returns to its normal high level, NG1 and NG2 switch from high to low. This triggers multivibrators LD2A and LD2B to each produce pulses of duration controlled by the variable resistors 366 and 367, respectively.

The trailing edge of the LD2A pulse, through sterring diode 368, triggers a multivibrator LLA to produce a pulse of duration about four microseconds. The duration of the pulse produced by LLA is controllable by variable resistor 369. The trailing edge of te LD2A pulse also triggers another multivibrator XSA to produce a pulse of duration about six microseconds. The duration of the pulse produced by XSA is controllable by a variable resistor 370. The trailing edge of the XSA pulse, through steering diode 371 retriggers LLA to again produce a pulse of the same duration as the first pulse, i.e., about 4 microseconds.

The output of LLA, Node E, is coupled through steering diodes 372 and 373 and through pattern intensity adjusting variable resistor 374 to one input of a video monitor 375. The function of LD2A is one of line delay, which, in combination with LD1, has the effect of establishing the position of the left-hand edge of zones P1 and P3. The first pulse produced by LLA, a line length timer, in response to the trailing edge of the LD2A pulse, determines the horizontal width of zone P1. The second pulse produced by LLA is response to the trailing edge of the XSA pulse determines the horizontal width of zone P2. Multivibrator XSA thus determines the horizontal, or X, separation between zones P1 and P2.

When LD2A is retriggered through NG1, as a result of the second NLA pulse turning on, to produce another pulse, timers LD2A, LLA and XSA are again rendered operative to produce pulses determining the position of zones P3 and P4 in a fashion entirely analogous to the above-described production of zones P1 and P2.

Line delay multivibrator LD2B, triggered on by NG2 at the same time as LD2A is triggered on by NG1, is adjustable through resistor 367 to produce a pulse which remains on until after the termination of the second pulse produced by LLA, as seen in FIG. 18. The trailing edge of te LD2B pulse, through diode 376 triggers LLB, a second line-length timer, to produce a pulse of about four microseconds. The duration of the pulse produced by LLB is controllable by a variable resistor 377. The trailing edge of the LD2B pulse also triggers multivibrator XSB to produce a pulse of duration about 6 microseconds. The duration of the XSB pulse is controllable via a variable resistor 378. The trailing edge of the XSB pulse, coupled through steering diode 379, triggers LLB to produce a second pulse of duration the same as the first, i.e., about 4 microseconds.

In a fashion entirely analogous to the above description with respect to timers LD2A, LLA and XSA, the trailing edge of the first LD2B pulse determines the left hand edge of zones P5 and P6 and the trailing edge of the second LD2B pulse determines the left hand edge of zones P7 and P8. The duration of the pulses produced by LLB determine the horizontal width of the zones P5–P8. The XSB timer, analogous to the XSA timer, determines the X, or horizontal, separation between zones P5 and P6 and between zones P7 and P8.

The output of LLB is coupled through a steering diode 380, pattern intensity adjusting resistor 374 and steering diode 373 to the same input of the video monitor 375 as was the output of LLA. Electronic signals representing the actual video image produced by vidicon 312 are coupled via line 315 to another input of the video monitor to effect superimposition of the actual video image and the pattern images produced by the circuit of FIG. 16.

In a fashion analogous to the description with respect to FIG. 4, video detectors 381 for white video and 382 for black video are enabled, via steering diode 383 to detect whenever either LLA or LLB is on, i.e., when any zone P1–P8 is present. A video amplifier 390 having appropriate amplifying and filtering functions preconditions the electronic signals representing the video image produced by vidicon 312 prior to conduction via line 391 to video detectors 381 and 382. Detected video is coupled via lines 384 and 385 and switches 386 and 387 and; depending upon the position of switch 387 optionally through inverting amplifier 388, and steering diode 389 to the first described input of video monitor 375.

In FIG. 16 the more pertinent nodes therein have been labeled A through J. Node A (the output of YSA) is coupled through an inverter 392 to node B; node C (the output of YSB) is coupled through an inverter 393 to node D; node G (the output of XSA) is coupled through an inverter 394 to node H; and Node I (the output of XSB) is coupled through an inverter 395 to node J. Node E is the output of LLA; and node F is the output of LLB.

It will be appreciated that the philosophy and operation of the circuit of FIG. 16 is in many ways analogous to that of the circuit of FIG. 14. Therefore, without further detailed discussion, it should be appreciated, for example, that nodes A, E, and G are all three on, i.e., at a high level, only during the duration of zone P1 in FIG. 13. Similarly nodes A, E, and H are all on, only during the duration of zone P2 in FIG. 13. Similar combinations of nodes A through J are readily derived for determining when, during a frame scan, each zone P1–P8 is on.

Figure 19:
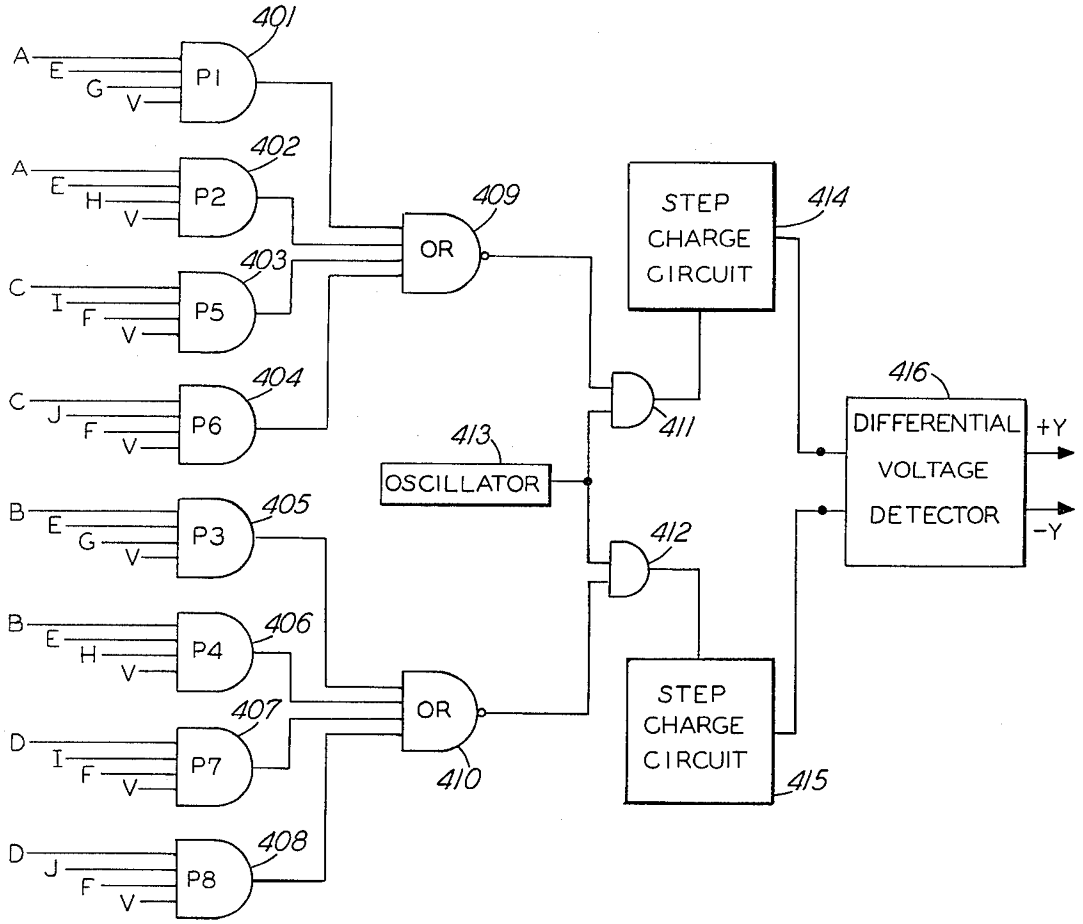
FIG. 19 is an electrical schematic block diagram of a circuit for detected coincidence between the images and for generating signals for application to stepping motors to accomplish automatic alignment.

The circuit of FIG. 19 provides the function of detecting coincidence between the video image produced by vidicon 312 and each of the pattern of zones P1–P8. The appropriate combinations of nodes are effected through eight AND gates 401–408, each of which is additionally labeled P1–P8 symbolizing the zone which each is for detecting. As seen, nodes A, E and G are coupled to separate inputs of AND gate 401; and detected video from either line 384 and 385 depending upon whether black or white is desired is coupled to a fourth input, labeled V, of AND gate 401. Accordingly, the output of AND gate 401 is on when the only when zone P1 is on and detected video V is coincident therewith. Similarly nodes A, E and H are coupled to separate inputs of AND gate 402 along with detected video V; and the output of AND gate 402 is on only when detected video from vidicon 312 is coincident with zone P2. The remaining AND gates 403–408 function analogously for zones P3–P8.

The outputs of gates 401–404 are coupled to separate inputs of an OR gate 409, whose output is on whenever anyone of the outputs of 401–404 are on. Similarly the outputs of gates 405 are coupled to separate inputs of an OR gate 410, whose output is accordingly on when anyone of the outputs of gates 404–408 is on.

The output of OR gate 409 is coupled to one input of an AND gate 411; and the output of OR gate 410 is coupled to one input of an AND gate 412. A high frequency, for example three megaHertz, oscillator 413 is coupled to other inputs of AND gates 411 and 412. Thus, whenever OR gate 409 is on, indicating video coincident with either zone P1, P2, P5 or P6, AND gate 411 is enabled to pass pulses from oscillator 413 to a step charge circuit 413. Similarly, whenever OR gate 410 is on, indicating video coincident with zones P3, P4, P7 or P8, AND gate 412 is enabled to pass pulses from oscillator 413 to a second step charge circuit 415.

The voltages developed on step charge circuits 414 and 415 are representative of the amount of time which detected video is coincident with the indicated zones. More specifically, the voltage developed on step charge circuit 414 represents the amount of time in which detected video is coincident with any one of zones P1, P2, P5 and P6. Similarly, the voltage developed on step charge circuit 415 represents the amount of time in which detected video is coincident with any one of zones P3, P4, P7 and P8. These voltages are compared with a differential voltage detector 416 whose output, if any, provides a signal indicating the need for movement of the zones or the workpiece in either the +Y or −Y direction.

For alignment in the X direction, a circuit (not shown) analogous to one in FIG. 19 is used to pass oscillator pulses to one step charge circuit whenever video is coincident with any one of zones P1, P3, P5 and P7; and to pass oscillator pulses to another step charge circuit whenever detected video is coincident with any one of zone P2, P4, P6 and P8. A second differential voltage detector compares these two step charge circuits and provides a signal indicating the need, if any, for movement in the X direction.

For $\theta$ or rotary alignment, a circuit (not shown) analogous to FIG. 19 can be used to detect and balance the video coincident with zones P1 and P2 against the video coincident with diagonally opposed zones P5 and P6. Alternatively, video coincident with zones P1, P2, P7 and P8 can be balanced against the video coincident with diagonally opposed zones P3, P4, P5 and P6 for greater sensitivity. For such balancing purposes of course, in the first example, P1 and P2 may be thought of as diagonally opposing zones with respect to P5 and P6 for the purpose of balancing the video. Similarly, the combination of zones P1, P2, P7 and P8 may be thought of as diagonally opposed to the combination of zones P3, P4, P5 and P6.

For X alignment, the combination of zones P1, P3, P5 and P7 may be thought of as a combination which is to be a balance against the horizontally opposed combination comprising zones P2, P4, P6 and P8. Similarly, for Y alignment the combination of zones P1, P2, P5 and P6 may be thought of as a combination to be balanced against the vertically opposed combination of P3, P4, P7 and P8.

With respect to moving the zones to accomplish rotary ($\theta$) alignment to a mask, it will be remembered from the foregoind discussion that the zones are not skewed, but rather the combination of zones P1–P4 is simply moved relative to the combination of zones P5–P8. This movement of zones by automatically, via motors, adjusting variable resistors in the circuit of FIG. 16 can readily be seen in the circuit of FIG. 16. Motor 345, which controls the duration of the ID1 pulse, controls the movement and position of the entire pattern structure comprising zones P1–P8 in the Y, or vertical, direction. Motor 354, which controls the duration of the ID2B pulse, moves the combination of zones P5–P8 in the vertical direction without affecting the position of zones P1–P4, inasmuch as zones P1–P4 are generated with the combination of ID2, NLA an YSA. Finally, motor 364 which controls the duration of the LD1 pulse has the effect of moving the entire pattern structure including zones P1–P8 in the horizontal direction.

It should be appreciated that the step charge circuit of FIG. 9, described with respect to the bonder embodiment, is suitable for use as the step charge circuits 414 and 415 in FIG. 19. Also, the differential detector of FIG. 10 is suitable for use as the differential voltage detector 416 of FIg. 19. Alternatively, any commercially available and suitable differential detector or differential meter may be substituted for the differential detectors of FIGs. 10 and 19 as desired, provided operation is of sufficient speed and sensitivity to effect the functions described in detail herein.

Although the invention has been described in part by making detailed reference to certain specific embodiments, such detail is intended to be, and will be understood to be, instructive rather than restrictive. It will be appreciated by those in the art that many variations may be made in the structure and modes of operation without departing from the spirit and scope of the invention as disclosed in the teachings contained herein.

For example, throughout the disclosure it will be understood that the duration of each of the pulses produced by the various circuits are controllable and variable and that the specific times for each of the pulses are given only by way of example as being somewhat typical.

Further, of course, a variety of changes and substitutions in the logic gates and types of delay mechanisms may be made provided the functions are retained in accordance with the teachings contained hereinabove.

Still further, of course, it will be appreciated that a great variety of different pattern structures may be used for the patterns of reference zones. The ones disclosed in detail hereinabove are presently considered advantageous, but are given by way of example only. It will be understood also that the inventive concepts disclosed hereinabove may as well be embodied in a spiral scan video type of system with indirect alignment in accordance with this invention. In that case, of course, it may be advantageous to convert the rectilinear zones into polar coordinates where they would appear as curvilinear zones.

Still further it will be appreciated that the pulses which are gated from the oscillator to the step charge circuits may as well be counted by appropriate counters rather than gated to step charge circuits.

Still further, it should be understood that counters, decoders, and other logic circuitry and delay timers can be used for selecting the particular scan lines and portions of scan lines which make up the zones used for alignment. The design of such circuits as equivalent alternates for or modifications of the circuits of FIGS. 4 and 16 in accordance with the teachings herein is well within the skill of the art and need not be further described.

What is claim is:

1. A method of aligning a first article to a second article comprising:
   - producing a first electrical signal indicative of the first article;
   - producing a second electrical signal indicative of a reference zone;
   - modifying the second signal in response to a comparison of the first and second signals to align the reference zone to the first article;
   - producing a third electrical signal indicative of the second article; and
   - moving the second article in response to a comparison of the third signal and the modified second signal to align the second article to the reference zone such that the second article is aligned to the first article.

2. A method as recited in claim 1 wherein the first, second, and third electrical signals are video signals.

3. A method as recited in claim 2 wherein the first and third video signals are produced by employing a camera and the second video signal is produced by employing an electronic circuit other than a camera.

4. A method as recited in claim 3 wherein the second video signal is modified by modifying parameters in the electronic circuit.

5. A method as recited in claim 4 wherein the electronic circuit responds to the horizontal and vertical sync signals of the camera such that the second video signal is synchronized with the first video signal.

6. A method as recited in claim 4 further comprising the steps of producing a plurality of uniformly timed pulses in response to coincidence of the first and second video signals; and storing the pulses produced during said coincidence to produce a voltage representative of the extent of said coincidence.

7. A method as recited in claim 6 comprising generating and applying signals to motors in response to the detected coincidence to automatically modify the parameters in the electronic circuit in accordance with said detected coincidence.

8. A method as recited in claim 6 further comprising producing a series of uniformly timed pulses in response to coincidence between the third signal and the modified second signal; and storing the pulses produced during said last-mentioned coincidence to produce a voltage representative of the extent of said last-mentioned coincidence.

9. A method as recited in claim 8 further comprising producing and applying signals to motors to move the second article in response to said last-mentioned detected coincidence.

10. A method of positioning a first workpiece with respect to a second workpiece comprising the steps of:

producing first video signals representing the scanning of the first workpiece along a multiplicity of scan lines;

electronically producing, in horizontal and vertical synchronism with the first video signals, additional signals representing the scanning of a matrix of discrete zones along a corresponding multiplicity of scan lines;

detecting coincidence of the first video signal with a portion of the additional signals representing selected ones of the plurality of zones;

modifying electronic parameters in accordance with the detected coincidence to effectively move and align the position of the zones with respect to the position of the one workpiece;

producing, in horizontal and vertical synchronism with the additional signals, second video signals representing the scanning of the second workpiece along a multiplicity of scan lines;;

detecting coincidence of the second video signals with a portion of the additional signals representing the selected ones of the plurality of zones; and moving the second workpiece in accordance with the last-mentioned detected coincidence to align the second workpiece with respect to the zones such that the second workpiece is aligned to the first workpiece.

11. A method as recited in claim 10 wherein the first workpiece is a semiconductor chip and the second workpiece is a substrate to which the chip is to be bonded.

12. A method as recited in claim 10 where the first workpiece is a photoresist mask and the second workpiece is a semiconductor wafer.

13. Apparatus for aligning a first article to a second article comprising:

means for producing a first electrical signal indicative of the first article;

means for producing a second electrical signal indicative of a reference zone;

means for modifying the second signal in response to a comparison of the first and second signals to align the reference zone to the first article;

means for producing a third electrical signal indicative of the second article; and means for moving the second article in response to a comparison of the third signal and the modified second signal to align the second article to the reference zone such that the second article is aligned to the first article.

14. Apparatus as recited in claim 13 wherein the first, second and third electrical signals are video signals.

15. Apparatus as recited in claim 14 wherein:

the first video signal represents a video image of the first article;

the second video signal represents a video image of a pattern of reference zones; and the third video signal represents a video image of the second article.

16. Apparatus as recited in claim 15 wherein:

the means for producing the first and third video signals includes a video camera; and the means for producing the second video signals includes an electronic circuit other than a video camera and responsive to horizontal and vertical sync pulses from the video camera.

17. Apparatus as recited in claim 16 wherein:

alignment of the zones to the first article is accomplished by substantially equalizing the coincidence of the image of the first article with selected opposing ones of the zones; and alignment of the second article to the zones is accomplished by substantially equalizing coincidence of the image of the second article with the selected opposing ones of the zones.

18. Apparatus as recited in claim 16 including means in the electronic circuit for adjusting the position of at least one of the zones without affecting the position of other ones of the zones.

19. Apparatus as recited in claim 18 wherein the adjusting means includes a variable impedance.

20. Appartus as recited in claim 16 including:

means for detecting coincidence between selected portions of the first and second video signals; and means for detecting coincidence between selected portions of the second and third video signals.

21. Apparatus as recited in claim 20 wherein:

said at least one zone and said opposing zone are diagonally opposed, whereby said equalization aligns the pattern to the first article in the rotary direction.

22. Apparatus as recited in claim 20 wherein the means for detecting coincidence between selected portions of the first and second video signals includes:

first means for detecting coincidence between the first video signals and that portion of the second video signals which represent at least one of the pattern of zones; and second means for detecting coincidence between the first video signals and that portion of the second video signals which represent an opposing one of the pattern of zones.

23. Apparatus as recited in claim 22 including:

a plurality of storage means for developing a voltage representative of a number of equal amplitude pulses applied thereto;

means for gating a plurality of uniformly timed ones of said pulses to a first one of said storage means during the time that said first detection means detects a coincidence; and means for gating another plurlaity of uniformly timed ones of said pulses to a second one of said storage means during the time that said second detection means detects a coincidence.

24. Apparatus as recited in claim 23 including:

means for comparing the voltages developed on the first and second storage means and for modifying a parameter in the electronic circuit means to modify said second video signals to substantially equalize the voltages developed on the first and second storage means.

25. Apparatus as recited in claim 24 wherein:

said at least one zone is an upper zone; and said opposing zone is a lower zone, whereby said equalization aligns the pattern to the first article in the vertical direction.

26. Apparatus as recited in claim 24 wherein:

said at least one zone is on the left side of the pattern; and said opposing zone is on the right side of the pattern, whereby said equalization aligns the pattern to the first article in the horizontal direction.

27. Apparatus as recited in claim 20 wherein the means for detecting coincidence between selected portions of the second and third video signals includes:

first means for detecting coincidence between the third video signals and that portion of the modified second video signals which represent at least one of the pattern of zones; and second means for detecting coincidence between the third video signals and that portion of the modified second video signals which represent an opposing one of the pattern of zones.

28. Apparatus as recited in claim 27 including:

a plurality of storage means for developing a voltage representative of a number of equal amplitude pulses applied thereto;

means for gating a plurality of uniformly timed ones of said pulses to a first one of said storage means during the time that said first detection means detects a coincidence; and means for gating another plurality of uniformly timed ones of said pulses to a second one of said storage means during the time that said second detection means detects a coincidence.

29. Apparatus as recited in claim 28 including:

means for comparing the voltages developed on the first and second storage means and for moving the second workpiece so that said third video signals are modified sufficiently that the voltage developed on the first and second storage means are substantially equalized.

30. Apparatus as recited in claim 29 wherein:

said at least one zone is an upper zone; and said opposing zone is a lower zone, whereby said equalization aligns the second article to the pattern in the vertical direction.

31. Apparatus as recited in claim 29 wherein:

said at least one zone is on the left side of the pattern; and said opposing zone is on the right side of the pattern, whereby said equalization aligns the second article to the pattern in the horizontal direction.

32. Apparatus as recited in claim 29 wherein:

said at least one zone and said opposing zones are diagonally opposed, whereby said equalization aligns the second article to the pattern in the rotary direction.

33. Apparatus as recited in claim 16 wherein the electronic circuit means includes:

first means responsive to the vertical sync pulse for producing a delayed pulse for selecting the horizontal scan lines on which the pattern occurs; and second means responsive to the horizontal sync pulse and to the first means for producing another delayed pulse for determining the position of the pattern along the selected scan lines.

34. Apparatus as recited in claim 33 wherein the first and second means include serially connected one-shot multivibrators for providing both the delays and the pulses.

35. Apparatus as recited in claim 34 wherein the means for modifying parameters in the electronic circuit includes a variable impedance element coupled to certain ones of the multivibrators for controlling the duration of pulses produced thereby.

36. Apparatus as recited in claim 35 wherein the variable impedance element is a variable resistor.

37. Apparatus as recited in claim 35 including a motor coupled to the variable impedance for automatic adjustment of impedance.

38. Apparatus as recited in claim 35 wherein the first article is a semiconductor chip and the second article is a substrate to which the chip is to be bonded.

39. Apparatus as recited in claim 35 wherein the first article is a photolithographic mask and the second article is a semiconductor wafer.

* * * * *

UNITED STATES PATENT OFFICE
CERTIFICATE OF CORRECTION

Patent No. 3,903,363 Dated September 2, 1975

Inventor(s) LIBER J. MONTONE, DONALD C. WALLS

It is certified that error appears in the above-identified patent and that said Letters Patent are hereby corrected as shown below:

Column 10, line 53, "into" (second occurrence) should be --onto--. Column 11, line 28, "27" should be --Z7--. Column 16, line 12, "time" should be --timer--; line 42, "milliseconds" should be --microseconds--; line 43, "LDB" (second occurrence) should be --LLB--. Column 18, line 13, "ouptu" should be --output--; line 67, "tomotor" should be --to motor--. Column 20, line 16, after "one" insert --input of an--; line 23, "27" should be --Z7--. Column 21, line 50, "by" should be --be--. Column 22, line 63, "310" should be --301--. Column 24, line 37, "puulse" should be --pulse--. Column 26, line 21, "sterring" should be --steering--; line 42, "is" should be --in--. Column 27, line 68, "the" (second occurrence) should be --and--. Column 28, line 13, "404" should be --405--. Column 29, line 31, "FIg." should be --FIG.--.

Signed and Sealed this

*ninth* Day of *December 1975*

[SEAL]

*Attest:*

RUTH C. MASON
*Attesting Officer*

C. MARSHALL DANN
*Commissioner of Patents and Trademarks*